United States Patent [19]

Oshikiri

[11] Patent Number: 5,504,626
[45] Date of Patent: Apr. 2, 1996

[54] WIDE-ANGLE ZOOM LENS SYSTEM HAVING A HIGH VARI-FOCAL RATIO

[75] Inventor: Minoru Oshikiri, Tokyo, Japan

[73] Assignee: Olympus Optical Co., Ltd., Toyto, Japan

[21] Appl. No.: 91,834

[22] Filed: Jul. 13, 1993

[30] Foreign Application Priority Data

Jul. 14, 1992 [JP] Japan ................................. 4-208570

[51] Int. Cl.⁶ ............................................... G02B 15/14
[52] U.S. Cl. .............................................. 359/689; 359/686
[58] Field of Search .................................. 359/686, 689, 359/688, 683

[56] References Cited

U.S. PATENT DOCUMENTS

| | | | |
|---|---|---|---|
| 3,481,664 | 12/1969 | Takano | 359/686 |
| 4,516,839 | 5/1985 | Tokumaru . | |
| 4,759,617 | 7/1988 | Tokumaru et al. . | |
| 5,000,550 | 3/1991 | Takahashi et al. . | |
| 5,159,493 | 10/1992 | Tsutsumi | 359/689 |
| 5,175,648 | 12/1992 | Mori | 359/689 |
| 5,204,779 | 4/1993 | Nakata et al. | 359/686 |
| 5,325,263 | 6/1994 | Tanaka | 359/689 |
| 5,365,376 | 11/1994 | Itoh | 359/686 |

FOREIGN PATENT DOCUMENTS

| | | |
|---|---|---|
| 58-95315 | 6/1983 | Japan . |
| 58-217910 | 12/1983 | Japan . |
| 2259614 | 10/1990 | Japan . |
| 4116613 | 4/1992 | Japan . |

Primary Examiner—Georgia Y. Epps
Assistant Examiner—Michael A. Papalas
Attorney, Agent, or Firm—Cushman, Darby & Cushman

[57] ABSTRACT

A wide-angle zoom lens system having a high vari-focal ratio comprising, in order from the object side, a first lens unit having a negative refractive power, a second lens unit having a negative refractive power and a third lens unit having a positive refractive power, and configured so as to change a magnification thereof by varying at least one airspace reserved between the first lens unit and the second lens unit. Owing to a fact that a distance as measured between principal points of the first lens unit and the second lens unit is defined within a certain definite range, the zoom lens system has a wide field angle of 70° or larger, a high vari-focal ratio of approximately 4, a telephoto ratio of approximately 1.5 at a tele position thereof and a compact size, and can be manufactured at a low cost.

22 Claims, 23 Drawing Sheets

SPHERICAL ABERRATION

ASTIGMATIC DIFFERENCE CURVATURE OF FIELD

LATERAL CHROMATIC ABERRATION

DISTORTION

SPHERICAL ABERRATION

ASTIGMATIC DIFFERENCE CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

FIG. 22A  
SPHERICAL ABERRATION
FIG. 22B  
ASTIGMATIC DIFFERENCE CURVATURE OF FIELD
FIG. 22C  
LATERAL CHROMATIC ABERRATION
FIG. 22D  
DISTORTION
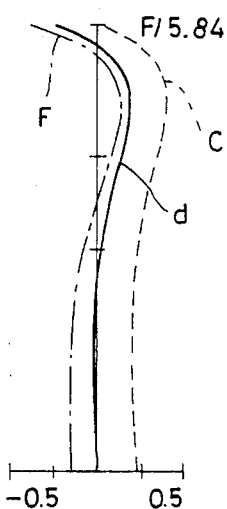
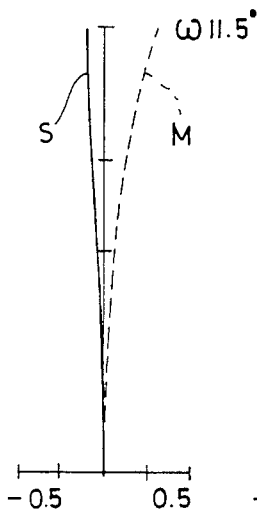
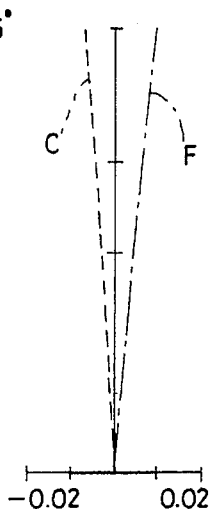
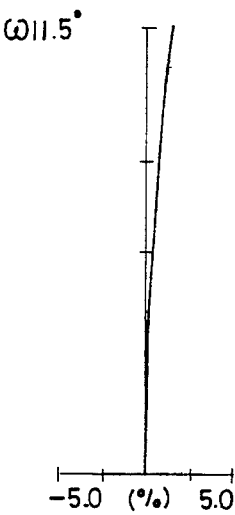
FIG. 23A  
SPHERICAL ABERRATION
FIG. 23B  
ASTIGMATIC DIFFERENCE CURVATURE OF FIELD
FIG. 23C  
LATERAL CHROMATIC ABERRATION
FIG. 23D  
DISTORTION
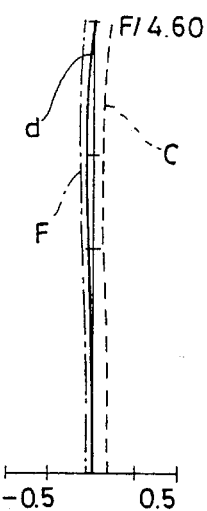
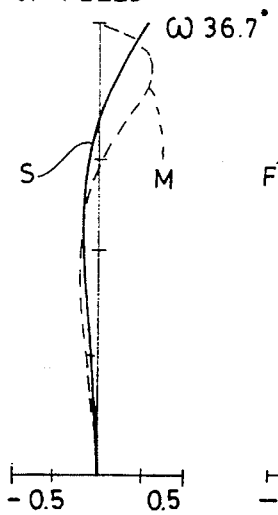
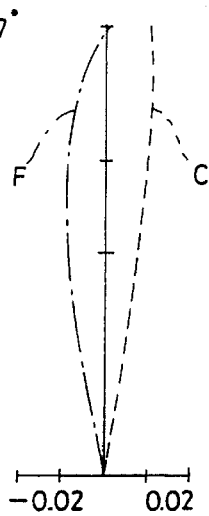
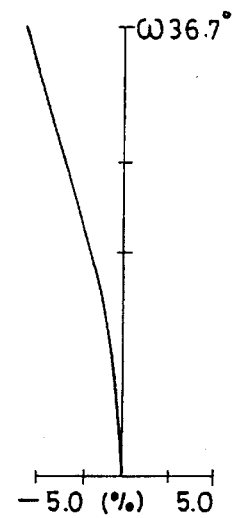

SPHERICAL
ABERRATION

ASTIGMATIC
DIFFERENCE
CURVATURE
OF FIELD

LATERAL
CHROMATIC
ABERRATION

DISTORTION

SPHERICAL
ABERRATION

ASTIGMATIC
DIFFERENCE
CURVATURE
OF FIELD

LATERAL
CHROMATIC
ABERRATION

DISTORTION

FIG. 26A
SPHERICAL ABERRATION
FIG. 26B
ASTIGMATIC DIFFERENCE CURVATURE OF FIELD
FIG. 26C
LATERAL CHROMATIC ABERRATION
FIG. 26D
DISTORTION
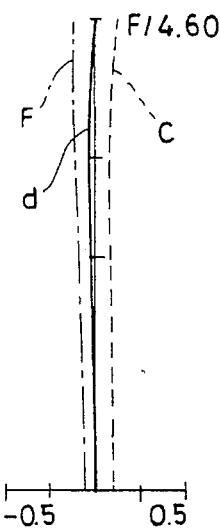
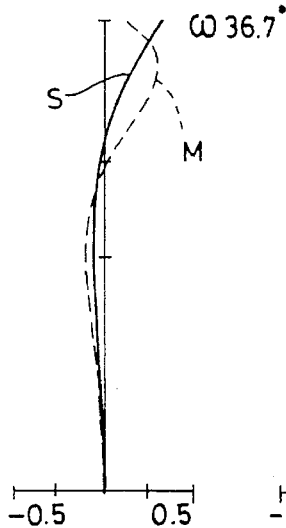
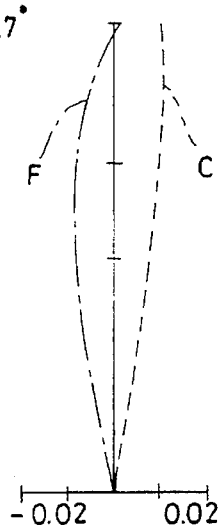
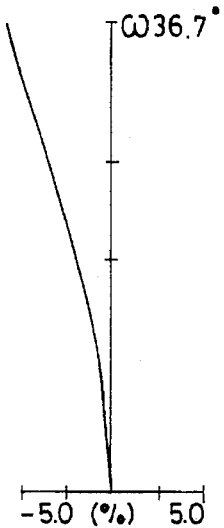
FIG. 27A
SPHERICAL ABERRATION
FIG. 27B
ASTIGMATIC DIFFERENCE CURVATURE OF FIELD
FIG. 27C
LATERAL CHROMATIC ABERRATION
FIG. 27D
DISTORTION
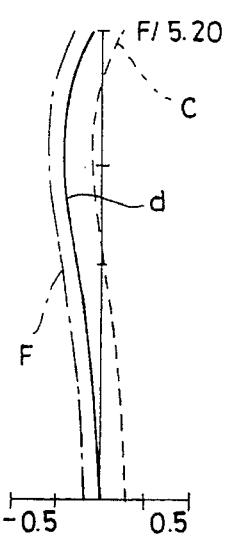
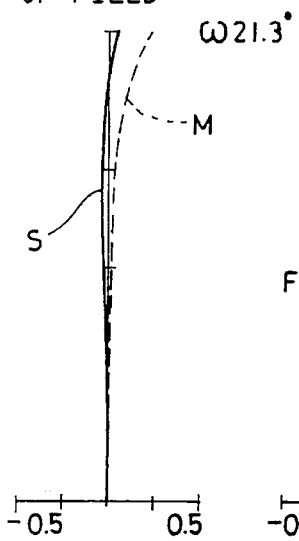
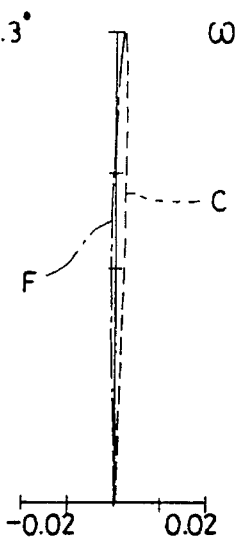
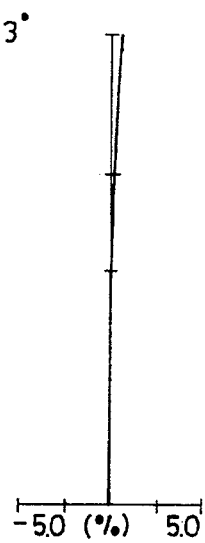

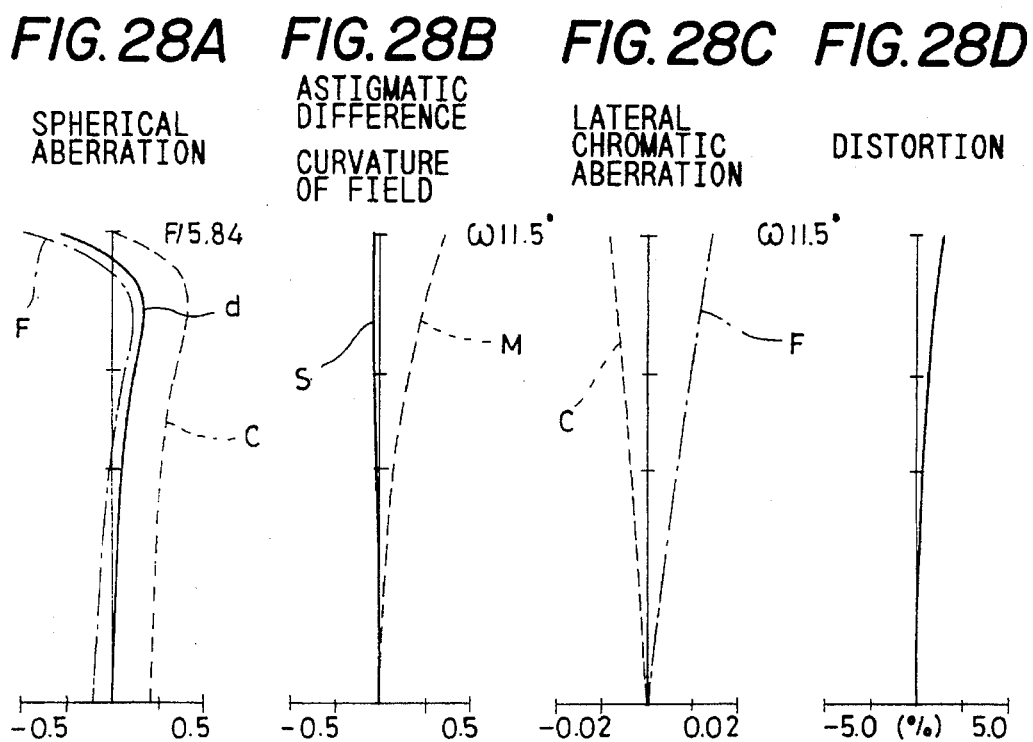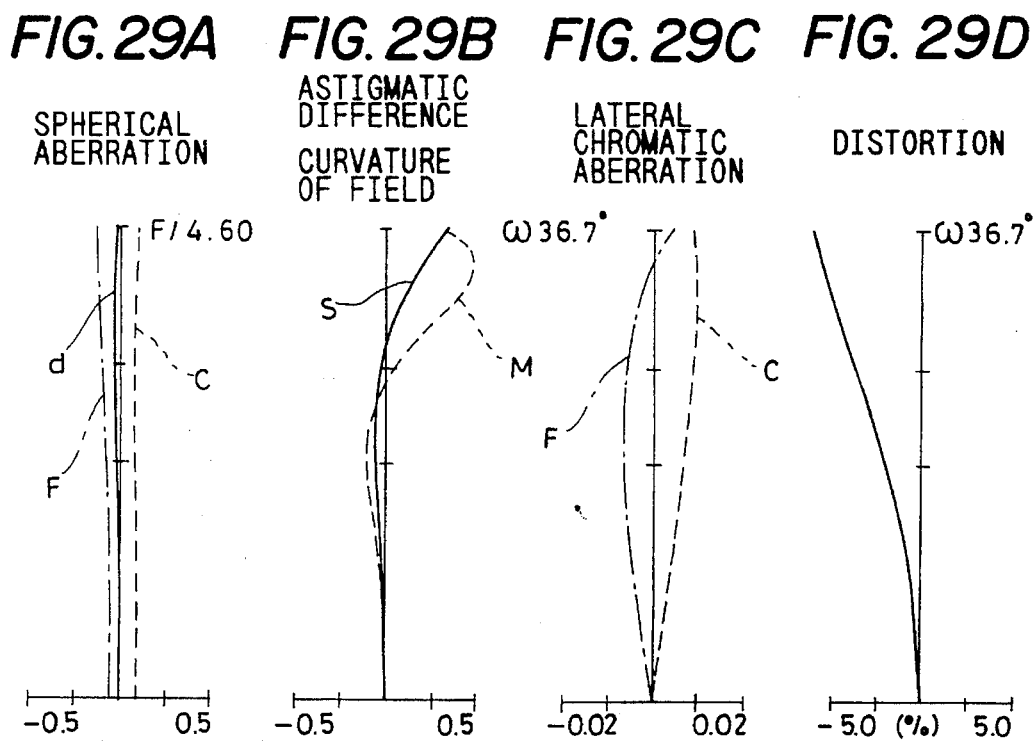

SPHERICAL ABERRATION

ASTIGMATIC DIFFERENCE CURVATURE OF FIELD

LATERAL CHROMATIC ABERRATION

DISTORTION

SPHERICAL ABERRATION

ASTIGMATIC DIFFERENCE CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

SPHERICAL ABERRATION

ASTIGMATIC DIFFERENCE
CURVATURE OF FIELD

LATERAL CHROMATIC ABERRATION

DISTORTION

FIG.34A  FIG.34B  FIG.34C  FIG.34D
SPHERICAL ABERRATION | ASTIGMATIC DIFFERENCE CURVATURE OF FIELD | LATERAL CHROMATIC ABERRATION | DISTORTION
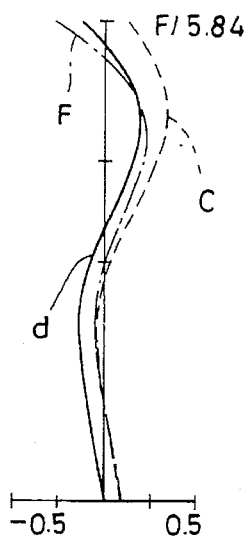
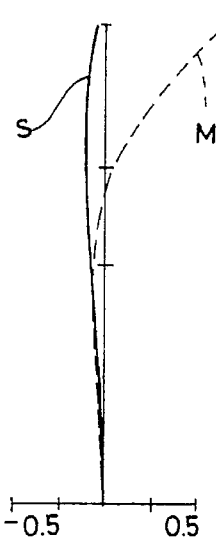
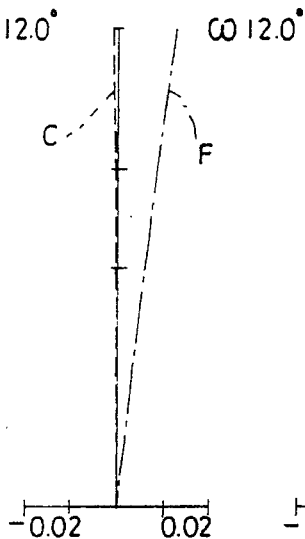
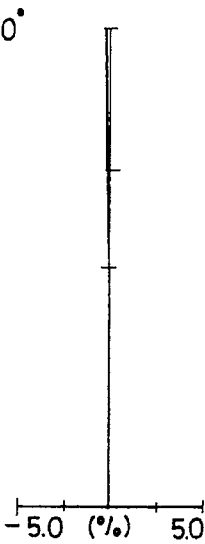
FIG.35A  FIG.35B  FIG.35C  FIG.35D
SPHERICAL ABERRATION | ASTIGMATIC DIFFERENCE CURVATURE OF FIELD | LATERAL CHROMATIC ABERRATION | DISTORTION
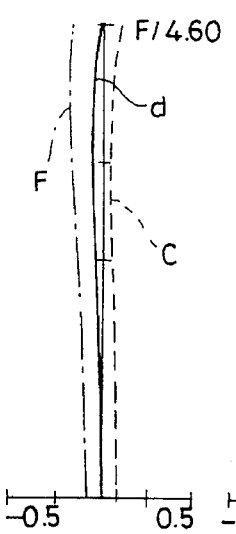
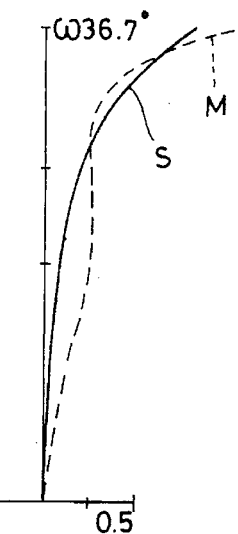
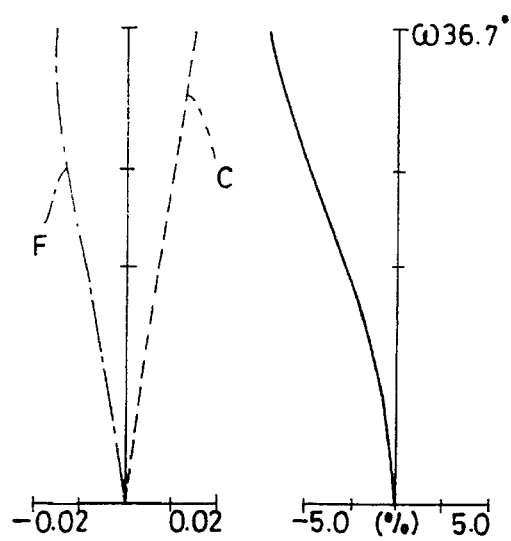
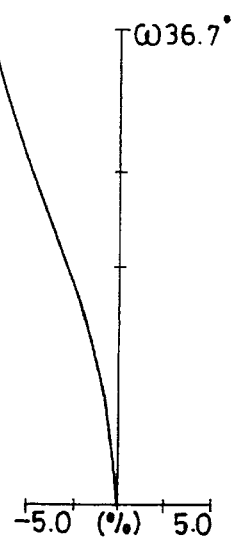

FIG.36A
SPHERICAL ABERRATION
FIG.36B
ASTIGMATIC DIFFERENCE CURVATURE OF FIELD
FIG.36C
LATERAL CHROMATIC ABERRATION
FIG.36D
DISTORTION
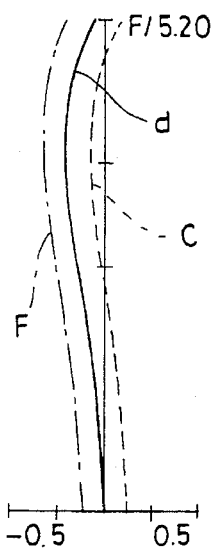
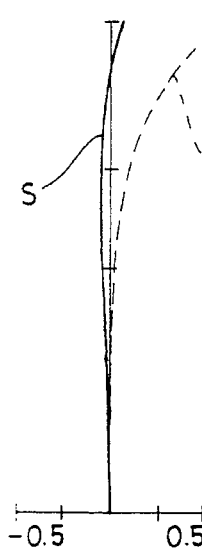
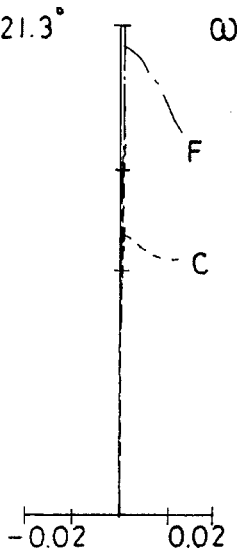
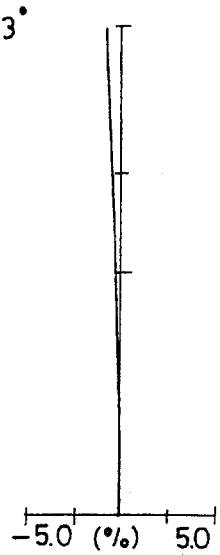
FIG.37A
SPHERICAL ABERRATION
FIG.37B
ASTIGMATIC DIFFERENCE CURVATURE OF FIELD
FIG.37C
LATERAL CHROMATIC ABERRATION
FIG.37D
DISTORTION
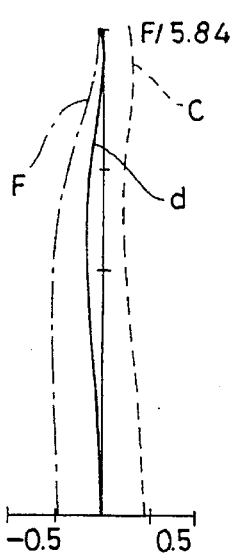
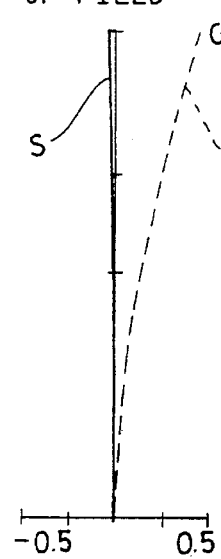
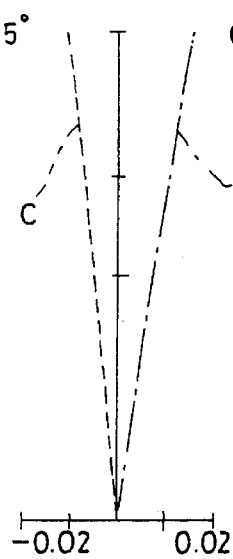
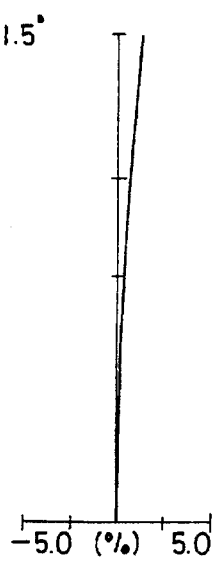

5,504,626

WIDE-ANGLE ZOOM LENS SYSTEM HAVING A HIGH VARI-FOCAL RATIO

BACKGROUND OF THE INVENTION a) Field of the Invention

The present invention relates to a wide-angle zoom lens system which has a high vari-focal ratio, and is to be used with silver salt cameras, video cameras and so on.

b) Description of the Prior Art

There is conventionally known, as a preferable zoom lens system, the so-called negative-leading type zoom lens system which uses a lens unit having a negative refractive power as a first lens unit disposed therein. As examples of the negative-leading type zoom lens systems, there are known a zoom lens system which consists of a first lens unit having a negative refractive power, and a second lens unit having a positive refractive power, and other zoom lens systems each of which consists, as exemplified by a zoom lens system disclosed by Japanese Patent Kokai Publication No. Sho 58-95,315 or Kokai Publication No. Sho 58-217,910, of a first lens unit having a negative refractive power, a second lens unit having a positive refractive power, a third lens unit having a positive refractive power and a fourth lens unit having a positive refractive power. Further, there are known still other zoom lens systems such as a lens system disclosed by Japanese Patent Kokai Publication No. Hei 2-259,614 which consists of a first lens unit having a negative refractive power, a second lens unit having a negative refractive power and a third lens unit having a positive refractive power, and a lens system disclosed by Japanese Patent Kokai Publication No. Hei 4-116,613 consisting of a first lens unit which has a negative refractive power and is kept fixed during a zooming operation, a second lens unit which has a negative refractive power and a function to correct a location of an image surface, a third lens unit which has a positive refractive power, and a fourth lens unit which has a negative refractive power and is kept fixed during a zooming operation, and a fifth lens unit which has a positive refractive power.

Out of the conventional examples described above, the zoom lens system consisting of two lens units has a vari-focal ratio which is as low as 2 or so and can hardly be enhanced.

Further, out of the conventional examples of the zoom lens systems each of which consists of four lens units, the zoom lens system disclosed by Japanese Patent Kokai Publication No. Sho 58-95,315 has a vari-focal ratio of approximately 4, but has a telephoto ratio as high as 1.8 at a tele position thereof and a large size, uses lens components in a number as large as 14 and requires a high manufacturing cost. Furthermore, the zoom lens system disclosed by Japanese Patent Kokai Publication No. Sho 58-217,910 has a vari-focal ratio of 3.5, but uses lens components in a number as large as 16, requires a high manufacturing cost and has a large size.

The zoom lens system disclosed by Japanese Patent Kokai Publication No. Hei 2-25,916 uses three lens units, two of which are obtained by dividing, into two, the first lens unit having the negative refractive power which is disposed in the above-mentioned zoom lens system consisting of the two lens units. The zoom lens system disclosed by this Japanese Patent is configured so as to correct aberrations mutually with a first lens unit over an entire zooming range and a second lens unit, and correct aberrations in a third lens unit. Due to the composition of the zoom lens system described above, the third lens unit consists of a large number of lens components for a low vari-focal ratio of 2.5 and the second lens unit is not used effectively for enhancing the vari-focal ratio of the zoom lens system.

Moreover, the zoom lens system disclosed by Japanese Patent Kokai Publication No. Hei 4-116,613 is configured so as to use five lens units by dividing, into two, the first lens unit of the zoom lens system consisting of the four lens units, and has a telephoto ratio of 6 or higher at a tele position thereof, a large size as a whole and a low vari-focal ratio of 3 due to a fact that the function to correct an image surface, which is allocated to the third lens unit in the conventional zoom lens system, is imparted to the second lens unit of this zoom lens system and a vari-focal function is not allocated to this second lens unit.

SUMMARY OF THE INVENTION

A primary object of the present invention is to provide a compact wide-angle zoom lens system which has a vari-focal ratio as high as approximately 4, and nevertheless a telephoto ratio of 1.5 or so at a tele position thereof and can be manufactured at a low cost.

The wide-angle zoom lens system having a high vari-focal ratio according to the present invention consists, in order from the object side, of a first lens unit having a negative refractive power, a second lens unit having a negative refractive power and a third lens unit which has a positive refractive power and comprises at least two sub-units, and is configured so as to perform variation of magnification by moving at least two subunits in a direction along an optical axis. The zoom lens system according to the present invention is configured so as to perform variation of magnification thereof by moving the first lens unit toward the image side and then toward the object side, and moving the at least two subunits disposed in the third lens unit so as to shorten a focal length of the third lens unit as a whole and shift a front principal point of the third lens unit as a whole toward the object side, and satisfies the following condition (1):

(1) $0.30 < H_{W12}/(H_{W12}+H_{W23}) < 1.0$ wherein the reference symbol $H_{W12}$ represents a distance as measured from a rear principal point of the first lens unit to a front principal point of the second lens unit and the reference symbol $H_{W23}$ designates a distance as measured from a rear principal point of the second lens unit to the front principal point of the third lens unit at the wide position of the zoom lens system.

Now, characteristics of the zoom lens system according to the present invention will be described with reference to a fundamental composition illustrated in FIG. 1. FIG. 1 through FIG. 3 show views descriptive of fundamental concepts of the zoom lens system according to the present invention. FIG. 1 shows a diagram illustrating a power distribution among the lens units and moving loci for the lens units disposed in the zoom lens system according to the present invention, FIG. 2 shows a diagram illustrating relationship among the principal points of the lens units, and FIG. 3 shows a graph visualizing relationship between the principal points and magnifications.

A lens system having the composition illustrated in FIG. 1 consists of a first lens unit $G_1$ having a negative refractive power, a second lens unit $G_2$ having a negative refractive power and a third lens unit $G_3$ which has a positive refractive power, and consists of a first subunit $G_{3A}$ having a positive refractive power, a second subunit $G_{3B}$ having a negative refractive power, a third subunit $G_{3C}$ having a positive refractive power and a fourth subunit $G_{3D}$ having a negative refractive power. In the zoom lens system described above as an example, the first lens unit $G_1$, the second lens unit $G_2$, and the first, second and third subunits $G_{3A}$, $G_{3B}$ and $G_{3C}$ of the third lens unit $G_3$ are moved along the optical axis for variation of a magnification of the zoom lens system.

The zoom lens system according to the present invention is of the negative-leading type which uses the first lens unit having the negative refractive power, like the lens system illustrated in FIG. 1, and is configured as a compact wide-angle zoom lens system having a high vari-focal ratio by disposing the second lens unit, which has the negative refractive power and is movable for zooming, between the first lens unit having the negative refractive power and the third lens unit having the positive refractive power.

When the front principal points and the rear principal points of the lens units disposed in the zoom lens system illustrated in FIG. 1 are represented by $H_1$, $H_1'$, $H_2$, $H_2'$, . . ., positional relationship among these principal points are as visualized in FIG. 2. At a wide position of this zoom lens system, the second lens unit $G_2$ has a magnification $\beta_{W2}$ which is expressed by the following formula (a):

$$\beta_{W2} = -f_2/(H_{W12} - f_1 - f_2) \qquad (a)$$

wherein the reference symbols $f_1$ and $f_2$ represents focal lengths of the first lens unit $G_1$ and the second lens unit $G_2$ respectively, and the reference symbol $H_{W12}$ designates a distance as measured from the rear principal point $H_1'$ to the front principal point $H_2$ of the second lens unit $G_2$.

At the wide position, it is desirable for shortening a focal length of the zoom lens system as a whole to select a magnification as low as possible for the second lens unit $G_2$. As is judged from the formula (a) and FIG. 3, it is therefore preferable to reserve the distance $H_{W12}$ between the principal points of the first lens unit and the second lens unit at the wide position of the zoom lens system.

Further, when a magnification of the second lens unit at the tele position is represented by $\beta_{T2}$, the second lens unit has an effect contributing to the magnification change which can be expressed by the following formula (b):

$$\beta_{T2}/\beta_{W2} = 1 + (H_{W12} - H_{T12})/(H_{T12} - f_1 - f_2) \qquad (b)$$

wherein the reference symbol $H_{T12}$ represents a distance as measured from the rear principal point $H_1'$ of the first lens unit to the front principal point $H_2$ of the second lens unit.

As is understood from the formula (b) mentioned above, the second lens unit has a higher effect for the magnification change as $(H_{W12} - H_{T12})$ has a larger value. In order to enlarge a value of $(H_{W12} - H_{T12})$, $H_{W12}$ must have a larger value.

It is therefore desirable to vary an airspace reserved between the first lens unit $G_1$ and the second lens unit $G_2$ so that these lens units are far from each other at the wide position, whereas these lens units are close to each other at the tele position.

FIG. 4 and FIG. 5 show partial sectional views exemplifying a concrete disposition of lens components for obtaining the refractive power distribution among the lens units of the zoom lens system illustrated in FIG. 1. Out of these drawings, FIG. 4 shows the first lens unit $G_1$ and the second lens unit $G_2$ at the wide position, whereas FIG. 5 shows the first lens unit $G_1$, the second lens unit $G_2$ and some of the lens components (subunits) disposed in the third lens unit $G_3$.

Since the second lens unit $G_2$ is far from the first lens unit $G_1$ at the wide position as illustrated in FIG. 4, a ray which is to attain to a maximum image height is not shielded by the second lens unit $G_2$. At the tele position at which the first lens unit $G_1$ and the second lens unit $G_2$ are close to each other as shown in FIG. 5, a paraxial marginal ray is not shielded by the second lens unit $G_2$. In contrast, a lower ray of a light bundle which is to attain to vicinities of an intermediate image height at the wide position is shielded by the second lens unit, whereby the second lens unit performs a role which is similar to that of the so-called flare stop. In this case, it is desirable that $N_{W12}$ has a large value since the role of the flare stop is reduced when the second lens unit $G_2$ is too close to the first lens unit $G_1$.

For the reason described above, it is important for accomplishing the primary object of the present invention to select an adequate location for the second lens unit $G_2$ between the first lens unit $G_1$ and the third lens unit $G_3$ at the wide position. The location of the second lens unit $G_2$ is expressed by a formula of $H_{W12}/(H_{W12} + H_{W23})$. Speaking concretely, a value of $H_{W12}/(H_{W12} + H_{W23})$ is defined within the range of the above-mentioned condition (1) for the zoom lens system according to the present invention.

If the lower limit of the condition (1) is exceeded, $N_{W12}$ will have a small value, thereby making the above mentioned function of the second lens unit $G_2$ too weak or $(H_{W12} + H_{W23})$ will have a large value, thereby making it impossible to configure the zoom lens system compact. If the upper limit of the condition (1) is exceeded, in contrast, the second lens unit $G_2$ must be moved for a prolonged distance for the magnification change, thereby making it difficult to structure a lens barrel, $(H_{W12} + H_{W23})$ will have too small a value, thereby making it impossible to reserve a sufficiently high vari-focal ratio for the third lens unit or the third lens unit $G_3$ will have too strong a refractive power, thereby making it difficult to obtain a zoom lens system which has a simple composition and favorably corrected aberrations.

Further, the zoom lens system according to the present invention adopts the third lens unit composed of at least the two subunits, and is configured so as to have a high vari-focal ratio and a compact size by moving these subunits independently so that the focal length of the third lens unit is shortened from the wide position to the tele position and has an enhanced magnification at the tele position.

Further, in order to configure the zoom lens system according to the present invention so as to have a high vari-focal ratio and a compact size, aberrations are corrected in the zoom lens system as a whole by producing spherical aberration and coma in directions reverse to those of spherical aberration and coma which are to be produced by the third lens unit. For this purpose, it is desirable to satisfy the following condition (2):

(2) $0.3 < R_{2R}/R_{3F} < 1.5$ wherein the reference symbol $R_{2R}$ represents a radius of curvature on an image side surface of the second lens unit and the reference symbol $R_{3F}$ designates a radius of curvature on an object side surface of the third lens unit.

If the lower limit of the condition (2) is exceeded, aberrations which are produced by the third lens unit will be overcorrected together with those produced by the second lens unit. If the upper limit of the condition (2) is exceeded, in contrast, the aberrations which are produced by the third lens unit will be undercorrected together with those produced by the second lens units.

The zoom lens system according to the present invention is configured so as to correct aberrations which are produced by the third lens unit at each focal length in the vicinity of the tele position by moving the second lens unit for the magnification change as described above. It is desirable that the movement of the second lens unit produces no adverse influences on aberrations at the wide position. For this purpose, it is desirable that the first lens unit and the second lens unit satisfy the following condition (3):

(3) $0.0 < R_{2F}/R_{1R} < 8.0$ wherein the reference symbol $R_{1R}$ represents a radius of curvature on an image side surface of the first lens unit and the reference symbol $R_{2F}$ designates a radius of curvature on an object side surface of the second lens unit.

If the condition (3) is not satisfied, a desirable effect will be obtained for correcting aberrations which are to be produced by the third lens unit by using the second lens unit, but distortion and coma will be aggravated at the wide position and the second lens unit or the first lens unit must be composed of a large number of lens components, thereby making it difficult to obtain a zoom lens system which has a compact size and can be manufactured at a low cost.

In order to allow the second lens unit to exhibit the above-described function for the magnification change, the role of the flare stop at the wide position and the aberration correcting function at the tele position more effectively, it is desirable that the second lens unit satisfies the following condition (4):

(4) $4 < f_2/f_1 < 20$

If the lower limit of the condition (4) is exceeded, the second lens unit will have a strengthened refractive power, thereby aggravating curvature of field at the wide position or the first lens unit will have a prolonged moving distance for focusing and aberrations will be varied remarkably by focusing. If the upper limit of the condition (4) is exceeded, in contrast, the second lens unit will have a weakened refractive power, thereby having lowered functions for the magnification change and correction of aberrations or the first lens unit will have a weakened refractive power, whereby the first lens unit must be composed of a large number of lens components and the zoom lens system will require a higher manufacturing cost.

As is understood from the formula (b), it is possible to obtain a zoom lens system which has a high vari-focal ratio and a compact size by selectings large value for $\beta_{T2}/\beta_{W2}$ when the refractive power of the first lens unit is strengthened with the value of $(H_{W12} - H_{T12})$ kept unchanged. This fact applies to relationship between the first lens unit and the third lens unit. When the refractive power of the first lens unit is strengthened excessively, however, the first lens unit produces aberrations in large amounts, and the first lens unit and the second lens unit must be composed of large numbers of lens components for correcting these aberrations, thereby making it difficult to obtain a zoom lens system which has a compact size and can be manufactured at low cost. It is therefore desirable that the zoom lens system according to the present invention satisfies the following condition (5):

(5) $0.2 < |f_1/f_T| < 0.7$ wherein the reference symbol $f_T$ represents a focal length of the zoom lens system as a whole at the tele position thereof.

If the upper limit of the condition (5) is exceeded, the refractive power of the first lens unit will be weakened, thereby making it difficult to obtain a zoom lens system which has a high vari-focal ratio and a compact size. If the lower limit of the condition (5) is exceeded, in contrast, the first lens unit will have a strengthened refractive power and produces aberrations in large amounts, and the first lens unit and the second lens unit must be composed of large number of lens components for correcting those aberrations, thereby producing a result undesirable for obtaining a zoom lens system which is compact and can be manufactured at a low cost.

The zoom lens system according to the present invention is configured so as to permit performing the magnification change within a desired range while enhancing a magnification by using a positive lens unit as the third lens unit and shifting the front principal point of the third lens unit toward the object side so as to narrow a distance as measured from the front principal point to a rear principal point of an optical system which is composed of the first lens unit and the second lens unit. The third lens unit comprises at least two subunits as already described above and a magnification of the third lens unit can be enhanced at the tele position by moving these two subunits independently for changing magnification from the wide position to the tele position so as to shorten a focal length of the third lens unit as a whole. This fact is effective for configuring the zoom lens system so as to have a high vari-focal ratio and a compact size.

When a focal length of the third lens unit at the tele position is represented by $f_{3T}$, it is more desirable to satisfy the following condition (6):

(6) $0.1 < f_{3T}/f_T < 0.4$

If the lower limit of the condition (6) is exceeded, the third lens unit will have too strong a refractive power and produce aberrations in large amounts, thereby making it impossible to correct aberrations without increasing a number of lens components to be disposed in the zoom lens system as a whole. If the upper limit of the condition (6) is exceeded, in contrast, the third lens unit will have a weakened refractive power, thereby making it necessary to prolong a moving distance of at least the second lens unit for obtaining the desired vari-focal ratio or producing a result undesirable for obtaining a compact zoom lens system.

Furthermore, it is desirable to select a composition described below for the third lens unit. That is to say, it is desirable to compose the third lens unit of at least three subunits, concretely a first subunit $G_{3A}$ having a positive refractive power, a second subunit $G_{3B}$ having a negative refractive power and a third subunit $G_{3C}$ having a positive refractive power, and to move at least these three subunits for zooming.

It is more desirable that the first subunit $G_{3A}$ has a focal length $f_{31}$ satisfying the following condition (7):

(7) $f_{31}/f_T < 0.4$

If the condition (7) is not satisfied, the third subunit must be moved for a long distance for obtaining the desired vari-focal ratio and such a long moving distance will be undesirable for obtaining a compact zoom lens system.

BRIEF DESCRIPTION OF THE DRAWINGS

FIGS. 22A–22D show curves illustrating aberration characteristics at the tele position of the third embodiment of the present invention;

FIGS. 23A–23D show curves illustrating aberration characteristics at the wide position of the fourth embodiment of the present invention;

FIGS. 26A–26D show graphs illustrating aberration characteristics at the wide position of the fifth embodiment of the present invention;

FIGS. 27A–27D show graphs illustrating aberration characteristics at the intermediate focal length of the fifth embodiment of the present invention;

FIGS. 28A–28D show graphs illustrating aberration characteristics at the tele position of the fifth embodiment of the present invention;

FIGS. 29A–29D show curves visualizing aberration characteristics at the wide position of the sixth embodiment of the present invention;

FIGS. 34A–34D show graphs visualizing aberration characteristics at the tele position of the seventh embodiment of the present invention;

FIGS. 35A–35D show curves illustrating aberration characteristics at the wide position of the eighth embodiment of the present invention;

FIGS. 36A–36D show curves illustrating aberration characteristics at the intermediate focal length of the eighth embodiment of the present invention; and FIGS. 37A–37D show curves illustrating aberration characteristics at the tele position of the eighth embodiment of the present invention.

DETAILED DESCRIPTION OF THE PREFERRED EMBODIMENTS

Figure 1:
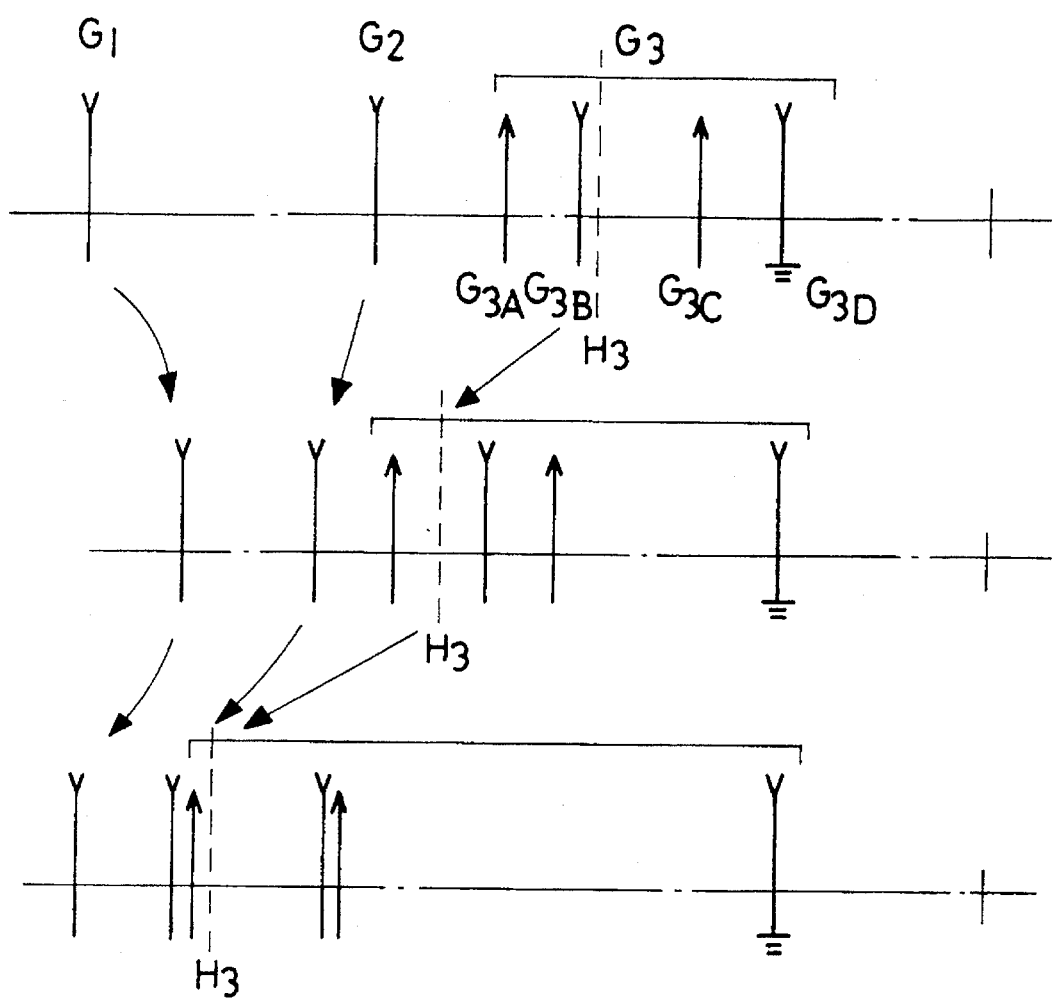
FIG. 1 shows a schematic diagram illustrating a fundamental composition of the wide-angle zoom lens system having a high vari-focal ratio according to the present invention.
Figure 2:
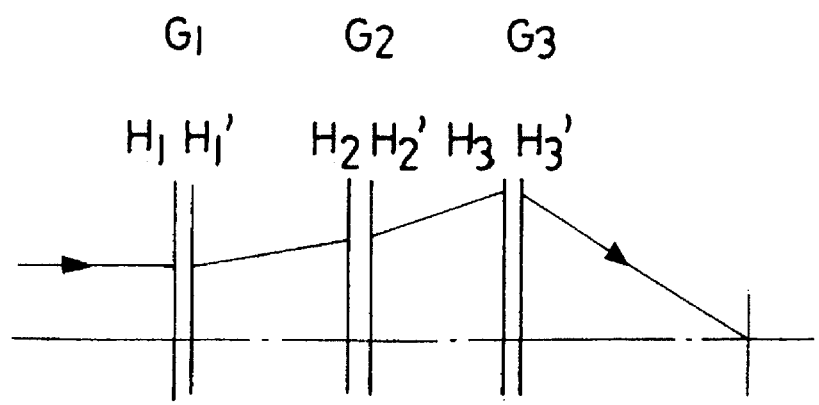
FIG. 2 shows a diagram illustrating principal points of the lens units to be disposed in the zoom lens system according to the present invention.
Figure 3:
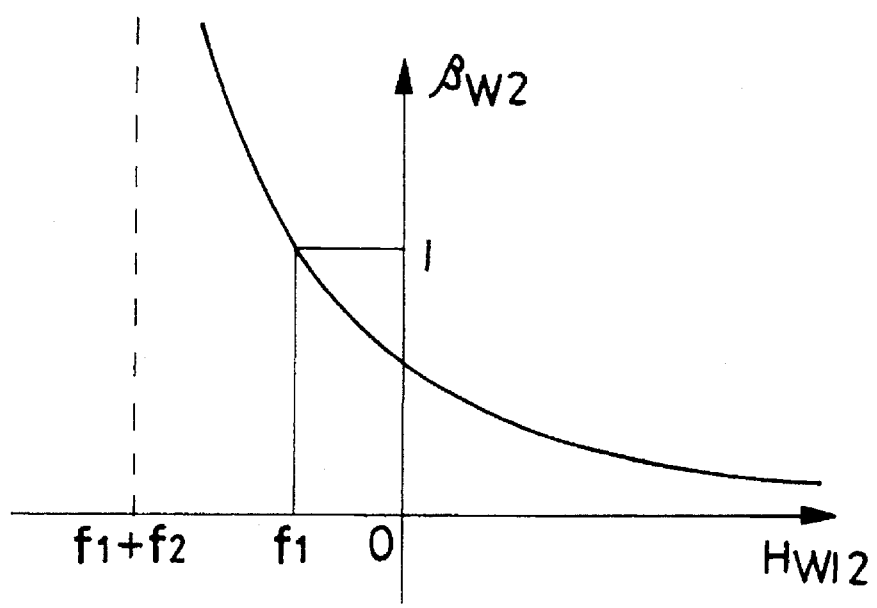
FIG. 3 shows a graph illustrating relationship of a distance as measured between the principal points of the first lens unit and the second lens unit versus a magnification of the second lens unit.
Figure 4:
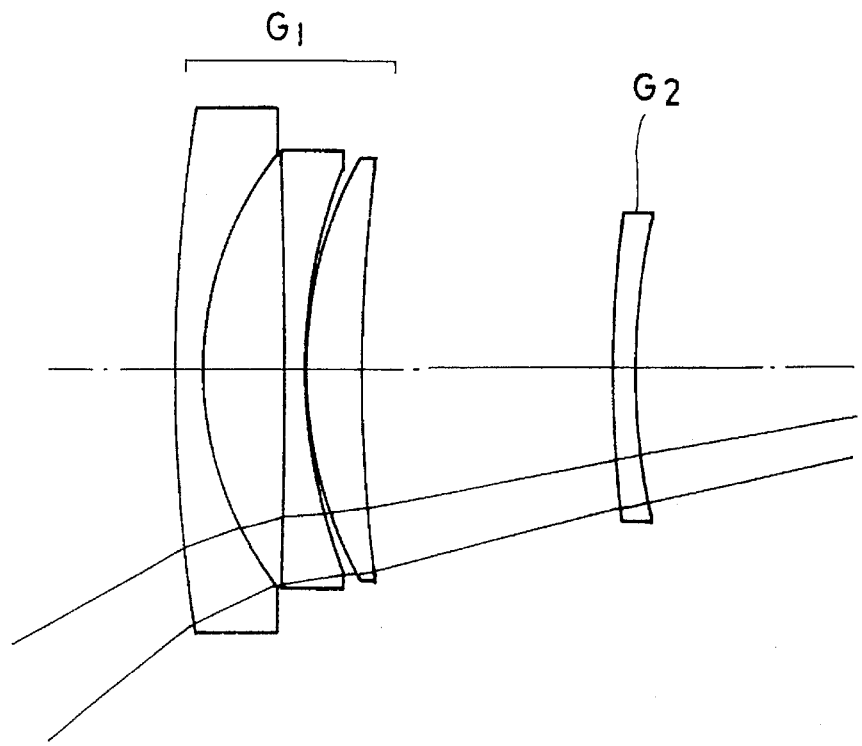
FIG. 4 and FIG. 5 show partial sectional views exemplifying compositions of the lens units to be disposed in the zoom lens system according to the present invention.
Figure 5:
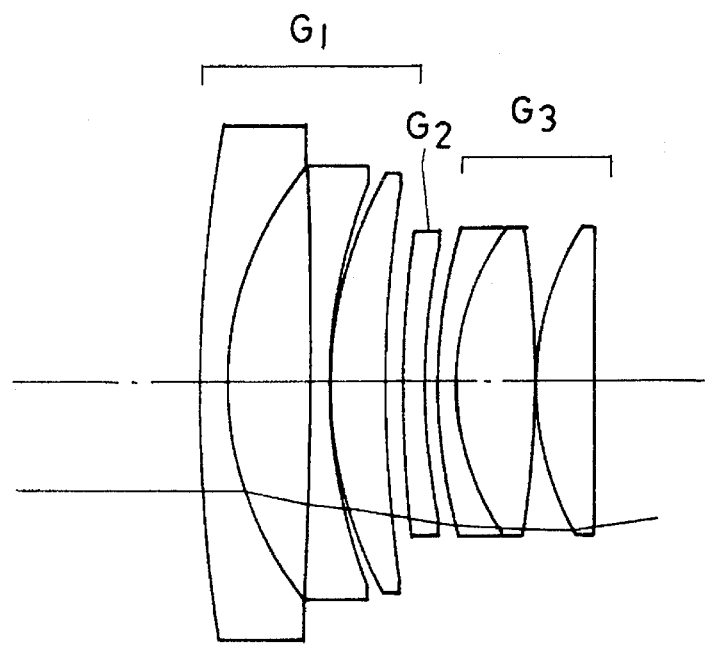

Now, the wide-angle zoom lens system having a high vari-focal ratio according to the present invention will be described more detailedly below with reference to the preferred embodiments illustrated in the accompanying drawings and given in the form of the following numerial data:

Embodiment 1

$f = 28.8 \sim 55.3 \sim 106.0$, F number = $4.6 \sim 5.2 \sim 5.84$

| | | |
|---|---|---|
| $r_1 = 108.7323$ | | |
| | $d_1 = 1.980$ | $n_1 = 1.78590$ $v_1 = 44.18$ |
| $r_2 = 25.6832$ | | |
| | $d_2 = 7.053$ | |
| $r_3 = -262.5110$ | | |
| | $d_3 = 1.738$ | $n_2 = 1.72916$ $v_2 = 54.68$ |
| $r_4 = 50.6163$ | | |
| | $d_4 = 0.150$ | |
| $r_5 = 36.3305$ | | |
| | $d_5 = 4.463$ | $n_3 = 1.84666$ $v_3 = 23.78$ |
| $r_6 = 128.9026$ | | |
| | $d_6 =$ variable | |

-continued

Embodiment 1 f = 28.8 ~ 55.3 ~ 106.0,  F number = 4.6 ~ 5.2 ~ 5.84

| | | | |
|---|---|---|---|
| $r_7 = 41.5099$ | | | |
| | $d_7 = 2.000$ | $n_4 = 1.48749$ | $v_4 = 70.20$ |
| $r_8 = 34.7527$ | | | |
| | $d_8 = $ variable | | |
| $r_9 = 51.6592$ | | | |
| | $d_9 = 1.500$ | $n_5 = 1.84666$ | $v_5 = 23.88$ |
| $r_{10} = 21.5382$ | | | |
| | $d_{10} = 6.318$ | $n_6 = 1.72916$ | $v_6 = 54.68$ |
| $r_{11} = -102.5377$ | | | |
| | $d_{11} = 0.150$ | | |
| $r_{12} = 27.0690$ | | | |
| | $d_{12} = 4.857$ | $n_7 = 1.48749$ | $v_7 = 70.20$ |
| $r_{13} = -255.0295$ | | | |
| | $d_{13} = $ variable | | |
| $r_{14} = $ stop | | | |
| | $d_{14} = 1.745$ | | |
| $r_{15} = -579.1368$ | | | |
| | $d_{15} = 3.469$ | $n_8 = 1.78472$ | $v_8 = 25.68$ |
| $r_{16} = -19.8029$ | | | |
| | $d_{16} = 1.500$ | $n_9 = 1.78590$ | $v_9 = 44.18$ |
| $r_{17} = 57.0250$ | | | |
| | $d_{17} = 1.158$ | | |
| $r_{18} = -88.3583$ | | | |
| | $d_{18} = 1.485$ | $n_{10} = 1.78590$ | $v_{10} = 44.18$ |
| $r_{19} = 108.8552$ | | | |
| | $d_{19} = $ variable | | |
| $r_{20} = 68.6007$ | | | |
| | $d_{20} = 3.679$ | $n_{11} = 1.69680$ | $v_{11} = 55.52$ |
| $r_{21} = -42.3806$ | | | |
| | $d_{21} = 0.150$ | | |
| $r_{22} = 35.3336$ | | | |
| | $d_{22} = 4.749$ | $n_{12} = 1.55232$ | $v_{12} = 63.75$ |
| $r_{23} = -39.8426$ | | | |
| | $d_{23} = 0.059$ | | |
| $r_{24} = -38.6416$ (aspherical surface) | | | |
| | $d_{24} = 1.800$ | $n_{13} = 1.80440$ | $v_{13} = 39.58$ |
| $r_{25} = 32.1582$ | | | | aspherical surface coefficient $E = -0.97947 \times 10^{-5}$, $F = -0.10810 \times 10^{-7}$,
$G = 0.11514 \times 10^{-9}$

| f | 28.8 | 55.3 | 106.0 |
|---|---|---|---|
| $d_6$ | 12.6861 | 10.6680 | 1.3000 |
| $d_8$ | 33.6506 | 6.9961 | 2.3777 |
| $d_{13}$ | 1.5000 | 6.6764 | 10.1510 |
| $d_{19}$ | 13.0293 | 7.8390 | 1.5000 |
| $f_B$ | 38.201 | 51.617 | 83.299 |

$H_{W12}/(H_{W12} + H_{W23}) = 0.533$, $R_{2R}/R_{3F} = 0.615$,
$R_{2F}/R_{1R} = 0.322$, $f_2/f_1 = 11.493$, $|f_1/f_T| = 0.398$,
$f_{3T}/f_T = 0.278$, $f_{31}/f_T = 0.259$

Embodiment 2 f = 29.0 ~ 55.5 ~ 106.1,  F number = 4.6 ~ 5.2 ~ 5.84

| | | | |
|---|---|---|---|
| $r_1 = 134.7423$ | | | |
| | $d_1 = 2.200$ | $n_1 = 1.74320$ | $v_1 = 49.31$ |
| $r_2 = 27.0821$ | | | |
| | $d_2 = 7.000$ | | |
| $r_3 = -435.7754$ | | | |
| | $d_3 = 1.900$ | $n_2 = 1.75700$ | $v_2 = 47.87$ |
| $r_4 = 48.3279$ | | | |
| | $d_4 = 0.150$ | | |
| $r_5 = 36.7495$ | | | |
| | $d_5 = 4.500$ | $n_3 = 1.84666$ | $v_3 = 23.78$ |
| $r_6 = 131.8168$ | | | |
| | $d_6 = $ variable | | |
| $r_7 = 62.2161$ | | | |
| | $d_7 = 2.000$ | $n_4 = 1.48749$ | $v_4 = 70.20$ |
| $r_8 = 44.1464$ | | | |
| | $d_8 = $ variable | | |
| $r_9 = 45.5286$ | | | |
| | $d_9 = 1.500$ | $n_5 = 1.84666$ | $v_5 = 23.78$ |
| $r_{10} = 21.5496$ | | | |

-continued

Embodiment 2 f = 29.0 ~ 55.5 ~ 106.1,  F number = 4.6 ~ 5.2 ~ 5.84

| | | | |
|---|---|---|---|
| $r_{11} = -97.3091$ | $d_{10} = 6.500$ | $n_6 = 1.71300$ | $v_6 = 53.84$ |
| $r_{12} = 25.2128$ | $d_{11} = 0.150$ | | |
| $r_{13} = \infty$ | $d_{12} = 4.850$ | $n_7 = 1.48749$ | $v_7 = 70.20$ |
| $r_{14}$ = stop | $d_{13}$ = variable | | |
| $r_{15} = -95.6768$ | $d_{14} = 1.000$ | | |
| $r_{16} = -17.3663$ | $d_{15} = 3.500$ | $n_8 = 1.80518$ | $v_8 = 25.43$ |
| $r_{17} = 19.8484$ | $d_{16} = 1.400$ | $n_9 = 1.76200$ | $v_9 = 40.10$ |
| $r_{18} = 88.5160$ | $d_{17}$ = variable | | |
| $r_{19} = -39.4021$ (aspherical surface) | $d_{18} = 4.000$ | $n_{10} = 1.53996$ | $v_{10} = 59.57$ |
| $r_{20} = -97.5417$ | $d_{19} = 0.150$ | | |
| $r_{21} = 215.6004$ | $d_{20} = 1.600$ | $n_{11} = 1.80518$ | $v_{11} = 25.43$ | aspherical surface coefficient $E = 0.18670 \times 10^{-4}$, $F = 0.99813 \times 10^{-8}$,
$G = 0.58878 \times 10^{-9}$, $H = -0.35096 \times 10^{-11}$,
$I = 0.15481 \times 10^{-15}$

| f | 29.0 | 55.5 | 106.1 |
|---|---|---|---|
| $d_6$ | 12.5000 | 5.0000 | 1.3000 |
| $d_8$ | 36.8939 | 13.3636 | 1.4650 |
| $d_{13}$ | 2.8000 | 6.7678 | 12.2407 |
| $d_{17}$ | 16.8866 | 9.6571 | 1.8000 |
| $f_B$ | 38.857 | 58.079 | 89.464 |

$H_{W12}/(H_{W12} + H_{W23}) = 0.424$, $R_{2R}/R_{3F} = 0.970$,
$R_{2F}/R_{1R} = 0.472$, $f_2/f_1 = 7.352$, $|f_1/f_T| = 0.415$,
$f_{3T}/f_T = 0.290$, $f_{31}/f_T = 0.252$

Embodiment 3 f = 29.0 ~ 55.5 ~ 106.1,  F number = 4.6 ~ 5.2 ~ 5.84

| | | | |
|---|---|---|---|
| $r_1 = 139.5160$ | $d_1 = 2.200$ | $n_1 = 1.74320$ | $v_1 = 49.31$ |
| $r_2 = 27.2990$ | $d_2 = 6.860$ | | |
| $r_3 = -778.4480$ | $d_3 = 1.850$ | $n_2 = 1.75700$ | $v_2 = 47.87$ |
| $r_4 = 45.3700$ | $d_4 = 0.150$ | | |
| $r_5 = 36.0080$ | $d_5 = 4.500$ | $n_3 = 1.84666$ | $v_3 = 23.78$ |
| $r_6 = 126.2960$ | $d_6$ = variable | | |
| $r_7 = 96.7600$ | $d_7 = 1.900$ | $n_4 = 1.48749$ | $v_4 = 70.20$ |
| $r_8 = 55.2090$ | $d_8$ = variable | | |
| $r_9 = 45.9600$ | $d_9 = 1.500$ | $n_5 = 1.84666$ | $v_5 = 23.78$ |
| $r_{10} = 21.6400$ | $d_{10} = 6.550$ | $n_6 = 1.71300$ | $v_6 = 53.84$ |
| $r_{11} = -86.4780$ | $d_{11} = 0.150$ | | |
| $r_{12} = 24.6080$ | $d_{12} = 4.700$ | $n_7 = 1.48749$ | $v_7 = 70.20$ |
| $r_{13} = 519.0230$ | $d_{13}$ = variable | | |
| $r_{14}$ = stop | $d_{14} = 1.100$ | | |
| $r_{15} = -101.0000$ | $d_{15} = 3.500$ | $n_8 = 1.80518$ | $v_8 = 25.43$ |
| $r_{16} = -17.7560$ | $d_{16} = 1.400$ | $n_9 = 1.76200$ | $v_9 = 40.10$ |
| $r_{17} = 39.9820$ | | | |

Embodiment 3

$f = 29.0 \sim 55.5 \sim 106.1$,   F number = $4.6 \sim 5.2 \sim 5.84$

| | | | |
|---|---|---|---|
| | $d_{17}$ = variable | | |
| $r_{18}$ = 100.5400 | | | |
| | $d_{18}$ = 4.000 | $n_{10}$ = 1.53746 | $v_{10}$ = 59.26 |
| $r_{19}$ = −35.8593 (aspherical surface) | | | |
| | $d_{19}$ = 0.150 | | |
| $r_{20}$ = −66.5000 | | | |
| | $d_{20}$ = 1.600 | $n_{11}$ = 1.80518 | $v_{11}$ = 25.43 |
| $r_{21}$ = ∞ | | | | aspherical surface coefficient $E = 0.17504 \times 10^{-4}$, $F = 0.58015 \times 10^{-7}$,
$G = -0.36949 \times 10^{-9}$, $H = 0.56249 \times 10^{-11}$,
$I = -0.31232 \times 10^{-13}$

| f | 29.0 | 55.5 | 106.1 |
|---|---|---|---|
| $d_6$ | 20.8091 | 5.0000 | 1.3000 |
| $d_8$ | 27.5201 | 12.0175 | 1.0642 |
| $d_{13}$ | 2.8000 | 6.6581 | 11.8980 |
| $d_{17}$ | 17.4191 | 9.7370 | 1.8000 |
| $f_B$ | 38.566 | 58.132 | 91.077 |

$H_{W12}/(H_{W12} + H_{W23}) = 0.526$, $R_{2R}/R_{3F} = 1.201$,
$R_{2F}/R_{1R} = 0.766$, $f_2/f_1 = 6.112$, $|f_1/f_T| = 0.413$,
$f_{3T}/f_T = 0.287$, $f_{31}/f_T = 0.249$

Embodiment 4

$f = 29.0 \sim 55.5 \sim 106.1$,   F number = $4.6 \sim 5.2 \sim 5.84$

| | | | |
|---|---|---|---|
| $r_1$ = 128.2990 | | | |
| | $d_1$ = 2.200 | $n_1$ = 1.74320 | $v_1$ = 49.31 |
| $r_2$ = 26.7779 | | | |
| | $d_2$ = 7.129 | | |
| $r_3$ = −528.9392 | | | |
| | $d_3$ = 1.850 | $n_2$ = 1.75700 | $v_2$ = 47.87 |
| $r_4$ = 45.9331 | | | |
| | $d_4$ = 0.150 | | |
| $r_5$ = 36.1113 | | | |
| | $d_5$ = 4.500 | $n_3$ = 1.84666 | $v_3$ = 23.78 |
| $r_6$ = 129.7053 | | | |
| | $d_6$ = variable | | |
| $r_7$ = 113.0451 | | | |
| | $d_7$ = 1.900 | $n_4$ = 1.48749 | $v_4$ = 70.20 |
| $r_8$ = 59.0568 | | | |
| | $d_8$ = variable | | |
| $r_9$ = 46.8154 | | | |
| | $d_9$ = 1.500 | $n_5$ = 1.84666 | $v_5$ = 23.78 |
| $r_{10}$ = 21.9319 | | | |
| | $d_{10}$ = 6.550 | $n_6$ = 1.71300 | $v_6$ = 53.84 |
| $r_{11}$ = −84.4078 | | | |
| | $d_{11}$ = 0.150 | | |
| $r_{12}$ = 24.5421 | | | |
| | $d_{12}$ = 4.800 | $n_7$ = 1.48749 | $v_7$ = 70.20 |
| $r_{13}$ = 374.4820 | | | |
| | $d_{13}$ = variable | | |
| $r_{14}$ = stop | | | |
| | $d_{14}$ = 1.100 | | |
| $r_{15}$ = −108.0777 | | | |
| | $d_{15}$ = 3.500 | $n_8$ = 1.80518 | $v_8$ = 25.43 |
| $r_{16}$ = −18.5338 | | | |
| | $d_{16}$ = 1.400 | $n_9$ = 1.76200 | $v_9$ = 40.10 |
| $r_{17}$ = 41.3196 | | | |
| | $d_{17}$ = variable | | |
| $r_{18}$ = 99.4556 | | | |
| | $d_{18}$ = 4.000 | $n_{10}$ = 1.53996 | $v_{10}$ = 59.57 |
| $r_{19}$ = −36.5275 (aspherical surface) | | | |
| | $d_{19}$ = 0.150 | | |
| $r_{20}$ = −66.4615 | | | |
| | $d_{20}$ = 1.600 | $n_{11}$ = 1.80518 | $v_{11}$ = 25.43 |
| $r_{21}$ = 50048.7656 | | | | aspherical surface coefficient $E = 0.17357 \times 10^{-4}$, $F = 0.57162 \times 10^{-7}$,
$G = -0.43206 \times 10^{-9}$, $H = 0.68099 \times 10^{-11}$,
$I = -0.36933 \times 10^{-13}$

| f | 29.0 | 55.5 | 106.1 |
|---|---|---|---|

Embodiment 4 f = 29.0 ~ 55.5 ~ 106.1,   F number = 4.6 ~ 5.2 ~ 5.84

| | | | |
|---|---|---|---|
| $d_6$ | 23.2397 | 5.0000 | 1.3000 |
| $d_8$ | 24.3143 | 11.3913 | 0.9789 |
| $d_{13}$ | 2.8000 | 6.6779 | 11.6965 |
| $d_{17}$ | 17.5596 | 9.7043 | 1.8000 |
| $f_B$ | 38.521 | 58.531 | 93.209 |

$H_{W12}/(H_{W12} + H_{W23}) = 0.567$, $R_{2R}/R_{3F} = 1.261$,
$R_{2F}/R_{1R} = 0.872$, $f_2/f_1 = 5.912$, $|f_1/f_T| = 0.409$,
$f_{3T}/f_T = 0.289$, $f_{31}/f_T = 0.251$

Embodiment 5 f = 29.0 ~ 55.5 ~ 106.1,   F number = 4.6 ~ 5.2 ~ 5.84

| | | | |
|---|---|---|---|
| $r_1 = 134.7242$ | | | |
| | $d_1 = 2.200$ | $n_1 = 1.74320$ | $v_1 = 49.31$ |
| $r_2 = 27.0438$ | | | |
| | $d_2 = 7.095$ | | |
| $r_3 = -396.5100$ | | | |
| | $d_3 = 1.900$ | $n_2 = 1.75700$ | $v_2 = 47.87$ |
| $r_4 = 47.8515$ | | | |
| | $d_4 = 0.150$ | | |
| $r_5 = 36.7245$ | | | |
| | $d_5 = 4.500$ | $n_3 = 1.84666$ | $v_3 = 23.78$ |
| $r_6 = 124.1468$ | | | |
| | $d_6 = $ variable | | |
| $r_7 = 70.6094$ | | | |
| | $d_7 = 2.000$ | $n_4 = 1.48749$ | $v_4 = 70.20$ |
| $r_8 = 42.9790$ | | | |
| | $d_8 = $ variable | | |
| $r_9 = 44.5625$ | | | |
| | $d_9 = 1.500$ | $n_5 = 1.84666$ | $v_5 = 23.78$ |
| $r_{10} = 21.8587$ | | | |
| | $d_{10} = 6.500$ | $n_6 = 1.71300$ | $v_6 = 53.84$ |
| $r_{11} = -92.4738$ | | | |
| | $d_{11} = 0.150$ | | |
| $r_{12} = 24.7297$ | | | |
| | $d_{12} = 4.850$ | $n_7 = 1.48749$ | $v_7 = 70.20$ |
| $r_{13} = \infty$ | | | |
| | $d_{13} = $ variable | | |
| $r_{14} = $ stop | | | |
| | $d_{14} = 1.000$ | | |
| $r_{15} = -99.3764$ | | | |
| | $d_{15} = 3.500$ | $n_8 = 1.80518$ | $v_8 = 25.43$ |
| $r_{16} = -18.1253$ | | | |
| | $d_{16} = 1.400$ | $n_9 = 1.76200$ | $v_9 = 40.10$ |
| $r_{17} = 41.0559$ | | | |
| | $d_{17} = $ variable | | |
| $r_{18} = 80.3935$ | | | |
| | $d_{18} = 4.000$ | $n_{10} = 1.53996$ | $v_{10} = 59.57$ |
| $r_{19} = -39.4301$ (aspherical surface) | | | |
| | $d_{19} = 0.150$ | | |
| $r_{20} = -91.1226$ | | | |
| | $d_{20} = 1.600$ | $n_{11} = 1.80518$ | $v_{11} = 25.43$ |
| $r_{21} = 209.5212$ | | | | aspherical surface coefficient $E = 0.19283 \times 10^{-4}$, $F = 0.12440 \times 10^{-7}$,
$G = 0.56478 \times 10^{-9}$, $H = -0.36430 \times 10^{-11}$,
$I = 0.37243 \times 10^{-14}$

| f | 29.0 | 55.5 | 106.1 |
|---|---|---|---|
| $d_6$ | 30.0110 | 6.2480 | 1.3000 |
| $d_8$ | 18.5070 | 10.8550 | 1.4450 |
| $d_{13}$ | 2.8000 | 6.1590 | 11.9970 |
| $d_{17}$ | 17.2910 | 9.6920 | 1.8000 |
| $f_B$ | 39.358 | 60.193 | 92.271 |

$H_{W12}/(H_{W12} + H_{W23}) = 0.688$, $R_{2R}/R_{3F} = 0.964$,
$R_{2F}/R_{1R} = 0.569$, $f_2/f_1 = 5.461$, $|f_1/f_T| = 0.399$,
$f_{3T}/f_T = 0.277$, $f_{31}/f_T = 0.244$

Embodiment 6 f = 29.0 ~ 55.5 ~ 106.1,  F number = 4.6 ~ 5.2 ~ 5.84

| | | | |
|---|---|---|---|
| $r_1 = 156.4009$ | | | |
| | $d_1 = 2.000$ | $n_1 = 1.77250$ | $v_1 = 49.66.$ |
| $r_2 = 28.3099$ | | | |
| | $d_2 = 6.357$ | | |
| $r_3 = -1741.7009$ | | | |
| | $d_3 = 1.800$ | $n_2 = 1.72916$ | $v_2 = 54.68$ |
| $r_4 = 44.6110$ | | | |
| | $d_4 = 0.150$ | | |
| $r_5 = 35.2409$ | | | |
| | $d_5 = 4.400$ | $n_3 = 1.80518$ | $v_3 = 25.43$ |
| $r_6 = 122.9933$ | | | |
| | $d_6$ = variable | | |
| $r_7 = 91.8836$ | | | |
| | $d_7 = 1.700$ | $n_4 = 1.50137$ | $v_4 = 56.40$ |
| $r_8 = 32.9729$ | | | |
| | $d_8 = 2.200$ | $n_5 = 1.59551$ | $v_5 = 39.21$ |
| $r_9 = 45.9615$ | | | |
| | $d_9$ = variable | | |
| $r_{10} = 45.4500$ | | | |
| | $d_{10} = 1.500$ | $n_6 = 1.84666$ | $v_6 = 23.78$ |
| $r_{11} = 21.1952$ | | | |
| | $d_{11} = 6.500$ | $n_7 = 1.71300$ | $v_7 = 53.84$ |
| $r_{12} = -93.3673$ | | | |
| | $d_{12} = 0.150$ | | |
| $r_{13} = 24.0892$ | | | |
| | $d_{13} = 4.850$ | $n_8 = 1.48749$ | $v_8 = 70.20$ |
| $r_{14} = 2165.9834$ | | | |
| | $d_{14}$ = variable | | |
| $r_{15}$ = stop | | | |
| | $d_{15} = 1.200$ | | |
| $r_{16} = -103.6729$ | | | |
| | $d_{16} = 3.500$ | $n_9 = 1.80518$ | $v_9 = 25.43$ |
| $r_{17} = -17.5111$ | | | |
| | $d_{17} = 1.400$ | $n_{10} = 1.76200$ | $v_{10} = 40.10$ |
| $r_{18} = 41.5450$ | | | |
| | $d_{18}$ = variable | | |
| $r_{19} = 94.5278$ | | | |
| | $d_{19} = 4.000$ | $n_{11} = 1.56873$ | $v_{11} = 63.16$ |
| $r_{20} = -44.4293$ (aspherical surface) | | | |
| | $d_{20} = 0.150$ | | |
| $r_{21} = -106.8472$ | | | |
| | $d_{21} = 1.600$ | $n_{12} = 1.80518$ | $v_{12} = 25.43$ |
| $r_{22} = 225.3169$ | | | | aspherical surface coefficient $E = 0.17523 \times 10^{-4}$, $F = 0.38813 \times 10^{-8}$,
$G = 0.60130 \times 10^{-9}$, $H = -0.27031 \times 10^{-11}$,
$I = -0.31230 \times 10^{-14}$

| f | 29.0 | 55.5 | 106.1 |
|---|---|---|---|
| $d_6$ | 29.8936 | 6.2480 | 1.3000 |
| $d_9$ | 19.0902 | 10.5626 | 1.1398 |
| $d_{14}$ | 2.4000 | 5.8112 | 11.1709 |
| $d_{18}$ | 17.4007 | 9.6530 | 1.8000 |
| $f_B$ | 39.520 | 60.256 | 93.833 |

$H_{W12}/(H_{W12} + H_{W23}) = 0.709$, $R_{2R}/R_{3F} = 1.011$,
$R_{2F}/R_{1R} = 0.747$, $f_2/f_1 = 5.155$, $|f_1/f_T| = 0.412$,
$f_{3T}/f_T = 0.282$, $f_{31}/f_T = 0.246$

Embodiment 7 f = 29.0 ~ 55.5 ~ 102.0,  F number = 4.6 ~ 5.2 ~ 5.84

| | | | |
|---|---|---|---|
| $r_1 = 443.6869$ | | | |
| | $d_1 = 2.000$ | $n_1 = 1.77250$ | $v_1 = 49.66$ |
| $r_2 = 32.5903$ | | | |
| | $d_2 = 3.441$ | | |
| $r_3 = 62.2498$ | | | |
| | $d_3 = 1.800$ | $n_2 = 1.77250$ | $v_2 = 49.66$ |
| $r_4 = 36.5648$ | | | |
| | $d_4 = 0.150$ | | |
| $r_5 = 28.6069$ | | | |
| | $d_5 = 4.500$ | $n_3 = 1.84666$ | $v_3 = 23.78$ |
| $r_6 = 42.3759$ | | | |
| | $d_6$ = variable | | |

-continued

Embodiment 7

$f = 29.0 \sim 55.5 \sim 102.0$,   F number $= 4.6 \sim 5.2 \sim 5.84$

| | | | |
|---|---|---|---|
| $r_7 = 263.6550$ | | | |
| | $d_7 = 1.900$ | $n_4 = 1.60311$ | $v_4 = 60.70$ |
| $r_8 = 33.4630$ | | | |
| | $d_8 = 1.495$ | | |
| $r_9 = 34.3196$ | | | |
| | $d_9 = 3.000$ | $n_5 = 1.59270$ | $v_5 = 35.29$ |
| $r_{10} = 125.3712$ | | | |
| | $d_{10} =$ variable | | |
| $r_{11} = 336.0540$ | | | |
| | $d_{11} = 2.800$ | $n_6 = 1.60311$ | $v_6 = 60.70$ |
| $r_{12} = -97.4767$ | | | |
| | $d_{12} = 0.150$ | | |
| $r_{13} = 25.2075$ | | | |
| | $d_{13} = 4.700$ | $n_7 = 1.69680$ | $v_7 = 55.52$ |
| $r_{14} = -242.2330$ | | | |
| | $d_{14} = 1.000$ | | |
| $r_{15} =$ stop | | | |
| | $d_{15} = 1.000$ | | |
| $r_{16} = 39.9050$ | | | |
| | $d_{16} = 4.700$ | $n_8 = 1.60311$ | $v_8 = 60.70$ |
| $r_{17} = -74.7879$ | | | |
| | $d_{17} = 1.500$ | $n_9 = 1.80518$ | $v_9 = 25.43$ |
| $r_{18} = 37.2953$ | | | |
| | $d_{18} = 2.700$ | | |
| $r_{19} = -34.7291$ | | | |
| | $d_{19} = 1.400$ | $n_{10} = 1.80100$ | $v_{10} = 34.97$ |
| $r_{20} = 108.1482$ | | | |
| | $d_{20} =$ variable | | |
| $r_{21} = 52.7817$ | | | |
| | $d_{21} = 6.000$ | $n_{11} = 1.59270$ | $v_{11} = 35.29$ |
| $r_{22} = -40.4082$ (aspherical surface) | | | |
| | $d_{22} = 0.150$ | | |
| $r_{23} = -77.9807$ | | | |
| | $d_{23} = 1.600$ | $n_{12} = 1.80610$ | $v_{12} = 40.95$ |
| $r_{24} = -198.0398$ | | | | aspherical surface coefficient $E = 0.14317 \times 10^{-4}$, $F = 0.63138 \times 10^{-7}$,
$G = -0.58018 \times 10^{-9}$, $H = 0.36692 \times 10^{-11}$,
$I = -0.82702 \times 10^{-14}$

| f | 29.0 | 55.5 | 102.0 |
|---|---|---|---|
| $d_6$ | 25.5198 | 5.0000 | 1.5000 |
| $d_{10}$ | 22.9835 | 11.4616 | 1.5000 |
| $d_{20}$ | 15.6935 | 10.0268 | 7.0365 |
| $f_B$ | 38.500 | 64.195 | 106.901 |

$H_{W12}/(H_{W12} + H_{W23}) = 0.399$, $R_{2R}/R_{3F} = 0.373$,
$R_{2F}/R_{1R} = 6.222$, $f_2/f_1 = 7.315$, $|f_1/f_T| = 0.468$,
$f_{3T}/f_T = 0.383$, $f_{31}/f_T = 0.524$

Embodiment 8

$f = 29.0 \sim 55.5 \sim 106.1$,   F number $= 4.6 \sim 5.2 \sim 5.84$

| | | | |
|---|---|---|---|
| $r_1 = -184.4995$ | | | |
| | $d_1 = 2.300$ | $n_1 = 1.60300$ | $v_1 = 65.48$ |
| $r_2 = 29.1820$ (aspherical surface) | | | |
| | $d_2 = 6.286$ | | |
| $r_3 = 43.3451$ | | | |
| | $d_3 = 4.108$ | $n_2 = 1.75550$ | $v_2 = 25.07$ |
| $r_4 = 87.4460$ | | | |
| | $d_4 =$ variable | | |
| $r_5 = 343.5360$ | | | |
| | $d_5 = 1.900$ | $n_3 = 1.49700$ | $v_3 = 81.61$ |
| $r_6 = 42.7268$ | | | |
| | $d_6 =$ variable | | |
| $r_7 = 46.2403$ | | | |
| | $d_7 = 1.500$ | $n_4 = 1.84666$ | $v_4 = 23.78$ |
| $r_8 = 22.9759$ | | | |
| | $d_8 = 5.600$ | $n_5 = 1.72916$ | $v_5 = 54.68$ |
| $r_9 = -123.2525$ | | | |
| | $d_9 = 0.150$ | | |
| $r_{10} = 23.4580$ | | | |
| | $d_{10} = 4.730$ | $n_6 = 1.49700$ | $v_6 = 81.61$ |
| $r_{11} = 29807.5862$ | | | |

-continued

Embodiment 8 f = 29.0 ~ 55.5 ~ 106.1,  F number = 4.6 ~ 5.2 ~ 5.84

| | | | |
|---|---|---|---|
| $r_{12}$ = stop | $d_{11}$ = variable | | |
| | $d_{12}$ = 1.100 | | |
| $r_{13}$ = −143.8893 | | | |
| | $d_{13}$ = 3.500 | $n_7$ = 1.80518 | $v_7$ = 25.43 |
| $r_{14}$ = −19.5966 | | | |
| | $d_{14}$ = 1.400 | $n_8$ = 1.79952 | $v_8$ = 42.24 |
| $r_{15}$ = 37.1362 | | | |
| | $d_{15}$ = variable | | |
| $r_{16}$ = 77.2187 | | | |
| | $d_{16}$ = 4.000 | $n_9$ = 1.53996 | $v_9$ = 59.57 |
| $r_{17}$ = −38.0322 (aspherical surface) | | | |
| | $d_{17}$ = 0.150 | | |
| $r_{18}$ = −67.8566 | | | |
| | $d_{18}$ = 1.600 | $n_{10}$ = 1.80518 | $v_{10}$ = 25.43 |
| $r_{19}$ = −2667.8957 | | | |
| (aspherical surface) | | | | aspherical surface coefficient (2nd surface)  $E = -0.26135 \times 10^{-5}$, $F = -0.58787 \times 10^{-8}$,
             $G = -0.41990 \times 10^{-11}$, $H = -0.13049 \times 10^{-14}$
(17th surface) $E = 0.15037 \times 10^{-4}$, $F = -0.92992 \times 10^{-9}$,
             $G = -0.38455 \times 10^{-10}$, $H = -0.73023 \times 10^{-12}$
(19th surface) $E = 0.72172 \times 10^{-6}$, $F = 0.30418 \times 10^{-7}$,
             $G = 0.60296 \times 10^{-10}$, $H = 0.32020 \times 10^{-12}$

| f | 29.0 | 55.5 | 106.1 |
|---|---|---|---|
| $d_4$ | 12.3789 | 5.0000 | 1.3000 |
| $d_6$ | 39.8722 | 14.7054 | 1.3800 |
| $d_{11}$ | 2.0000 | 4.9906 | 10.4578 |
| $d_{15}$ | 18.2567 | 9.4364 | 1.8000 |
| $f_B$ | 38.500 | 59.415 | 87.481 |

$H_{W12}/(H_{W12} + H_{W23}) = 0.363$, $R_{2R}/R_{3F} = 0.924$,
$R_{2F}/R_{1R} = 3.929$, $f_2/f_1 = 1.372$, $|f_1/f_T| = 0.676$,
$f_{3T}/f_T = 0.287$, $f_{31}/f_T = 0.243$ wherein the reference symbols $r_1, r_2, \ldots$ represent radii of curvature on the surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, the reference symbols $v_1, v_2, \ldots$ represent Abbe's numbers of the respective lens elements, the reference symbol f designates a focal length of zoom lens system as a whole, and the reference symbol $f_B$ denotes a back focal length of zoom lens system.

Figure 6A:
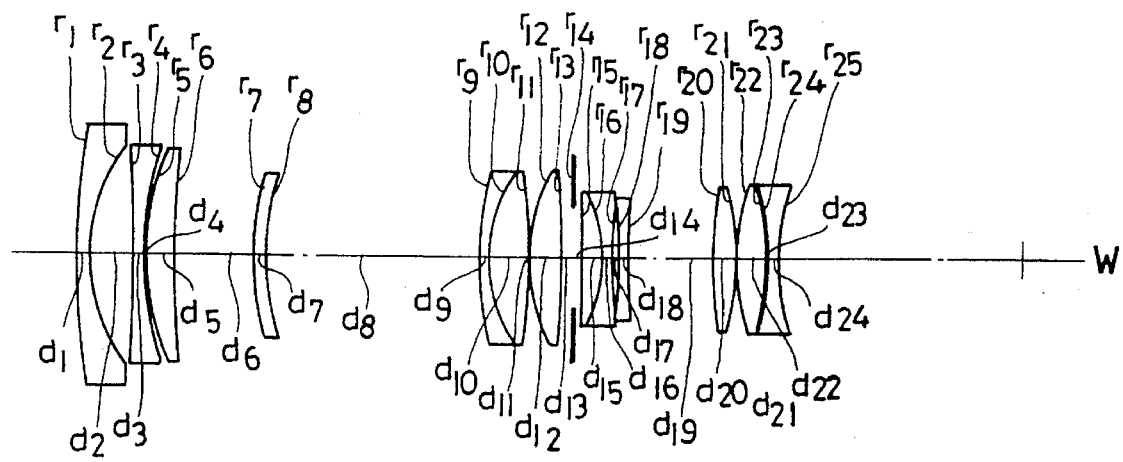
FIG. 6A through FIG. 13C show sectional views illustrating compositions of a first embodiment through an eighth embodiment of the zoom lens system according to the present invention.
Figure 6B:
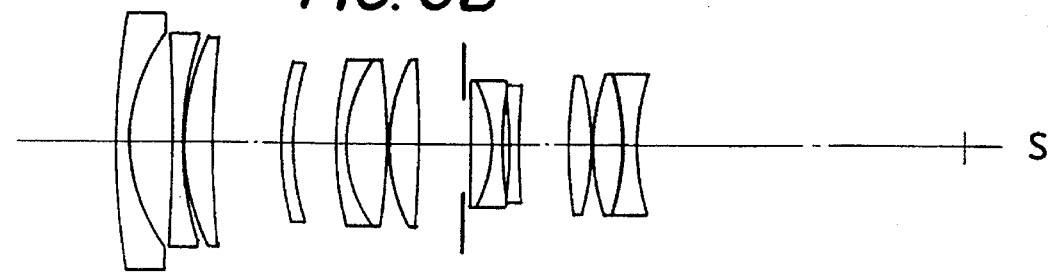
Figure 6C:
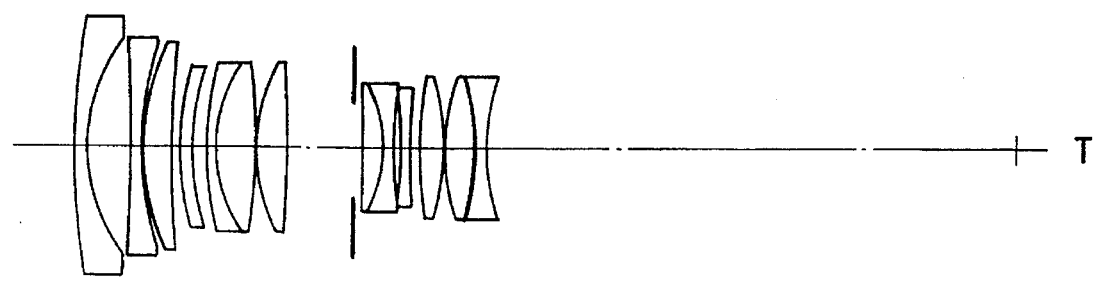
Figure 7A:
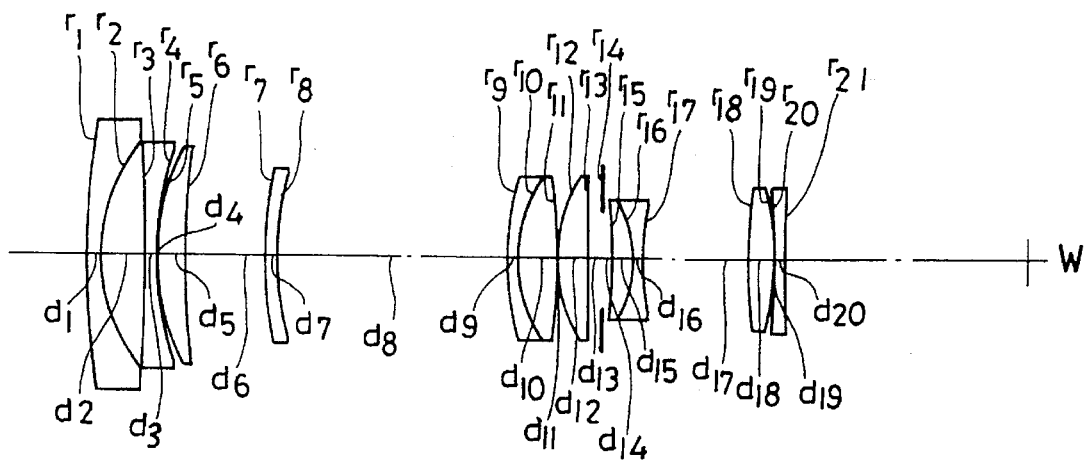
Figure 7B:
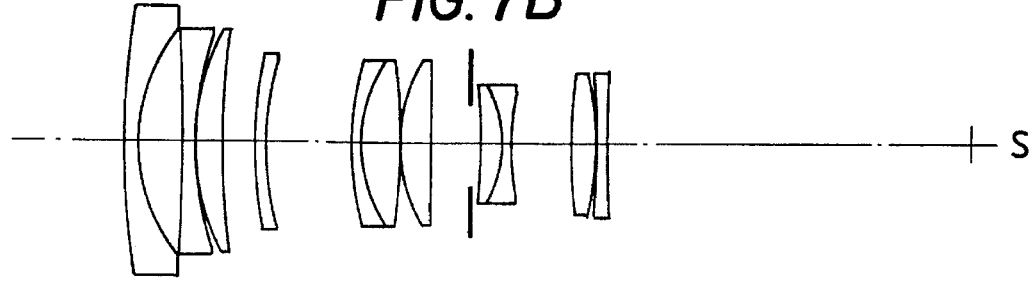
Figure 7C:
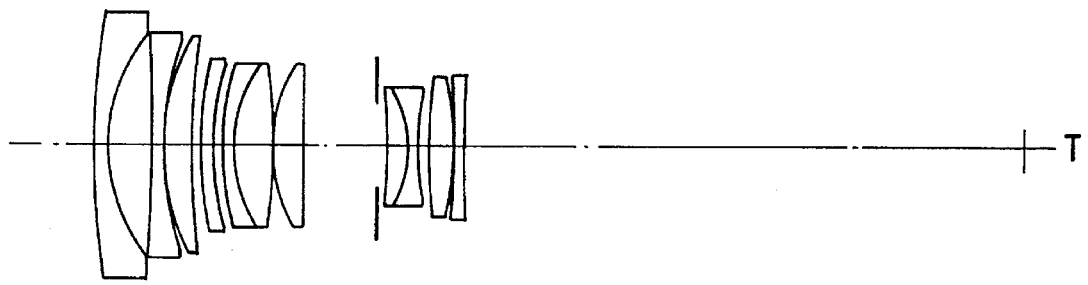
Figure 8A:
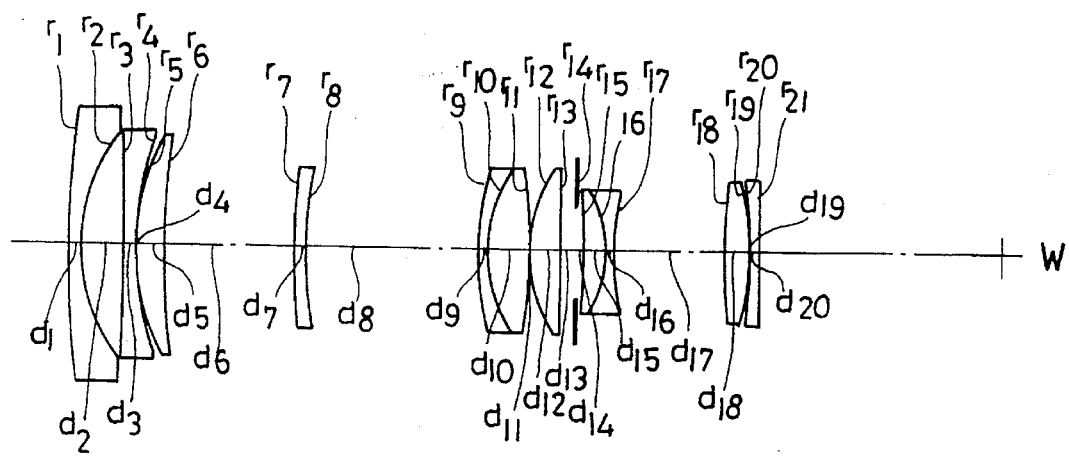
Figure 8B:
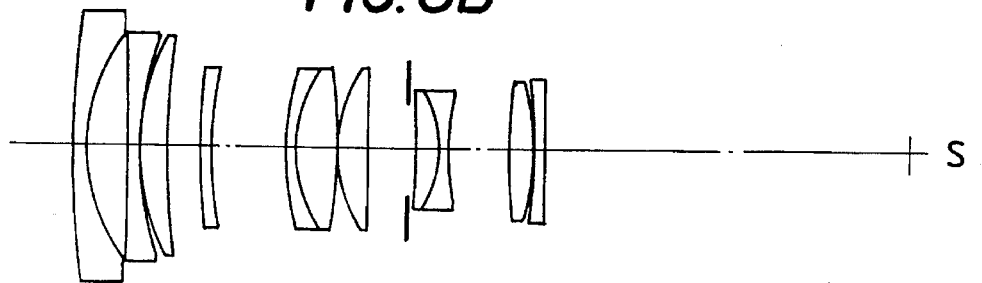
Figure 8C:
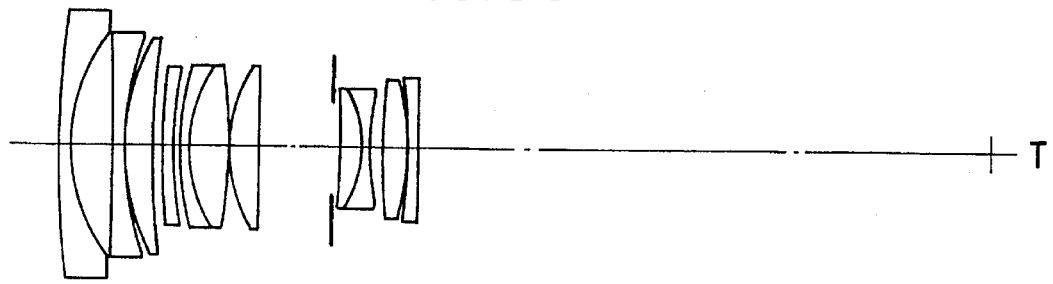
Figure 9A:
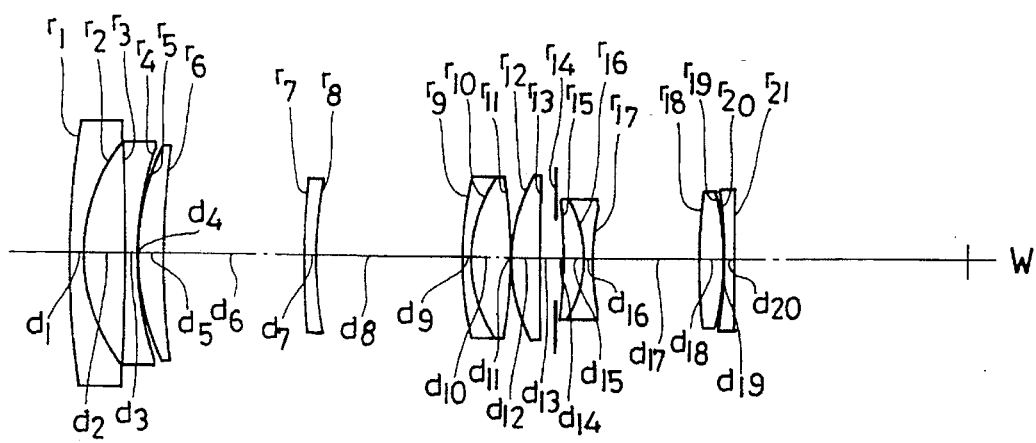
Figure 9B:
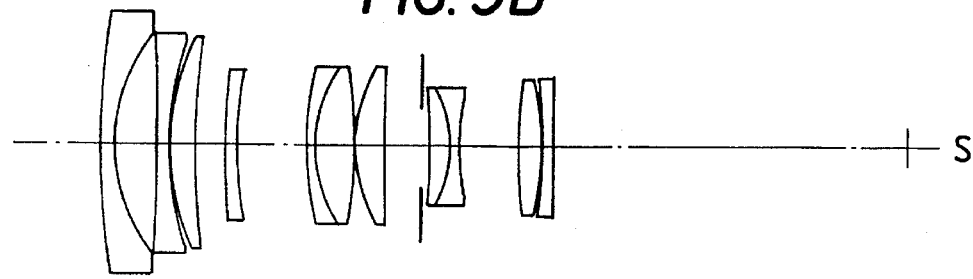
Figure 9C:
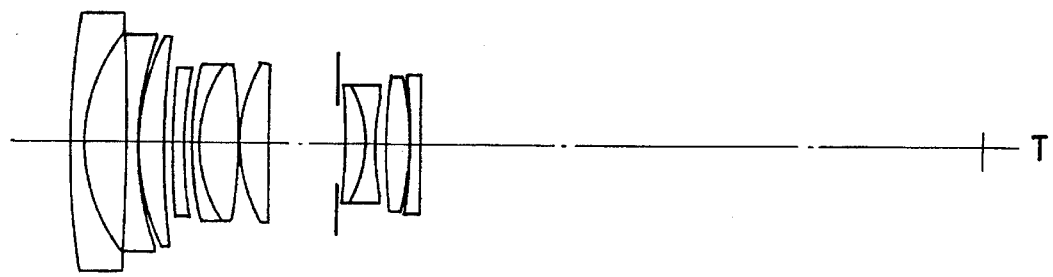
Figure 10A:
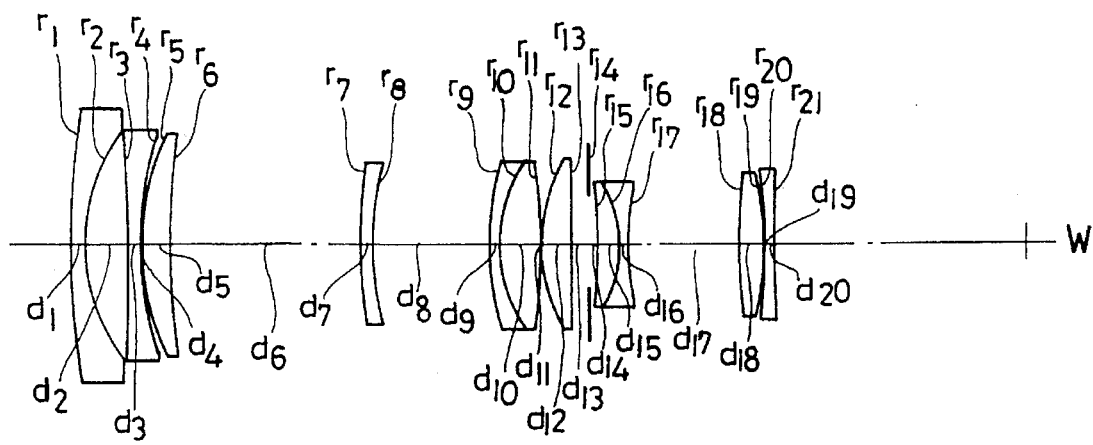
Figure 10B:
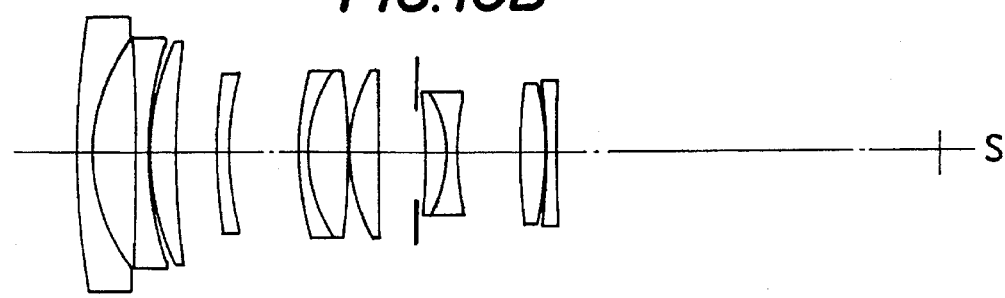
Figure 10C:
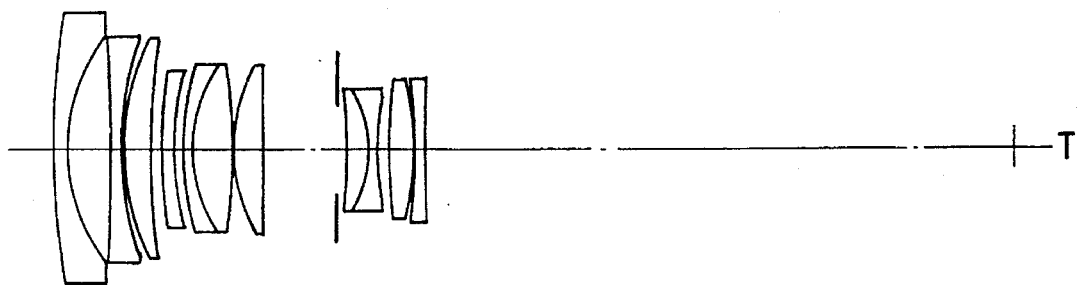
Figure 11A:
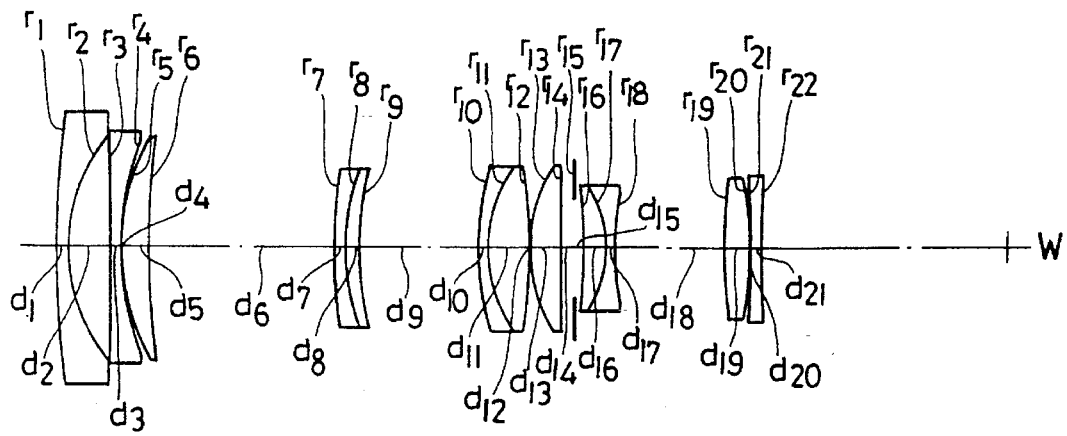
Figure 11B:
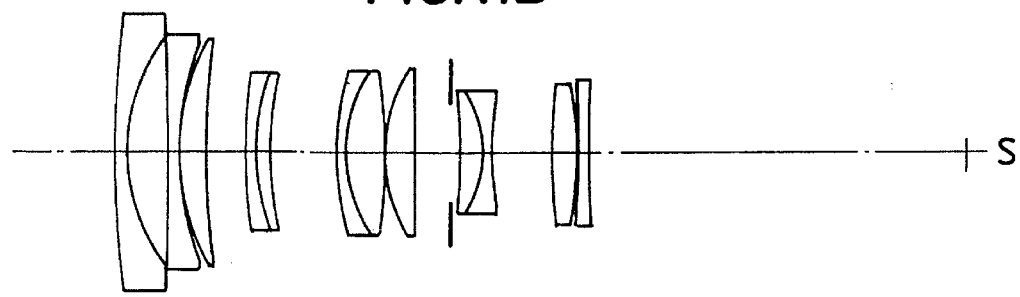
Figure 11C:
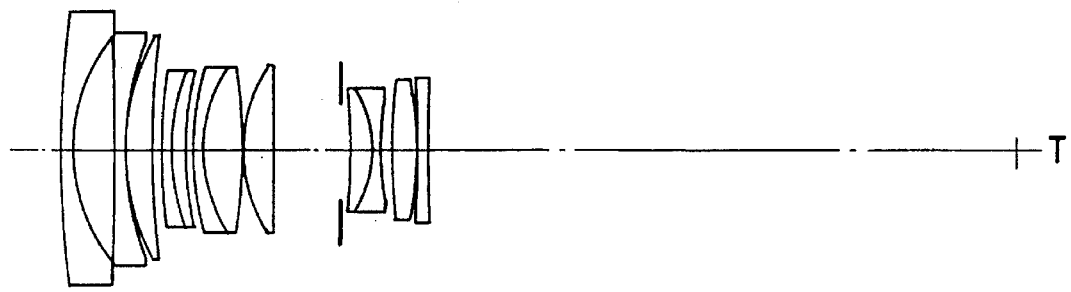
Figure 12A:
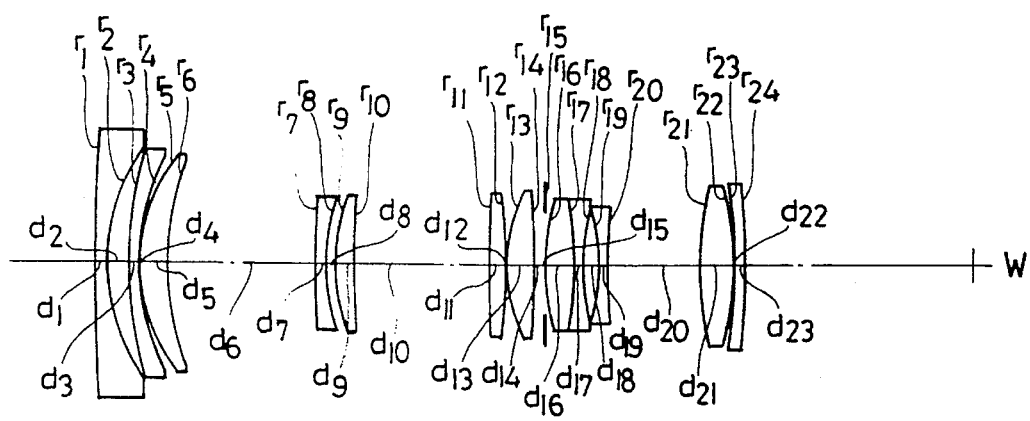
Figure 12B:
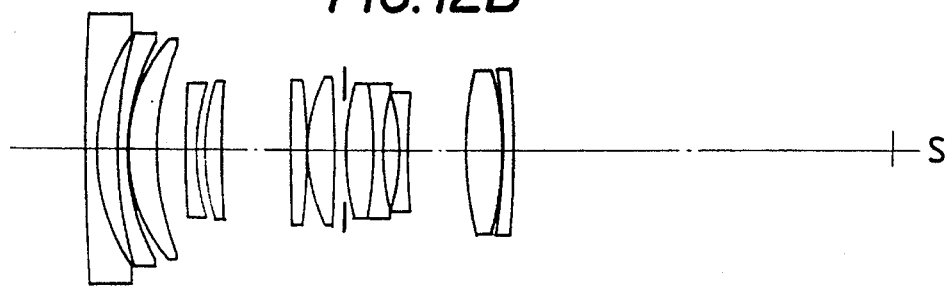
Figure 12C:
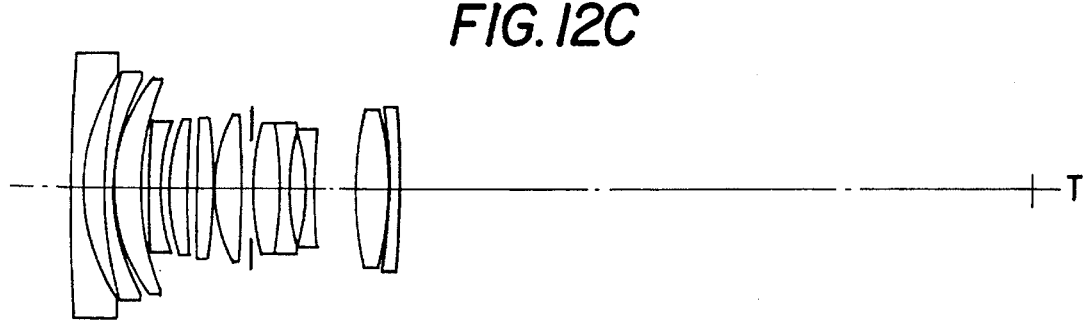
Figure 13A:
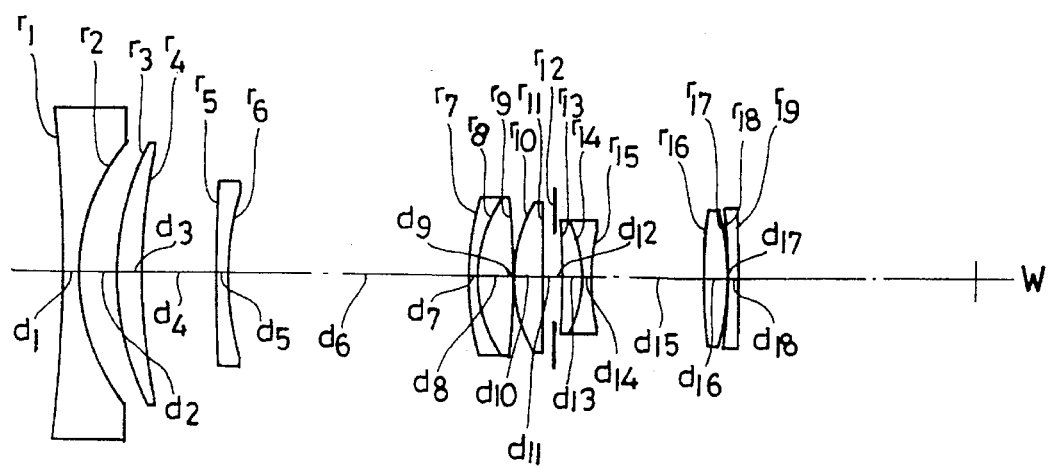
Figure 13B:
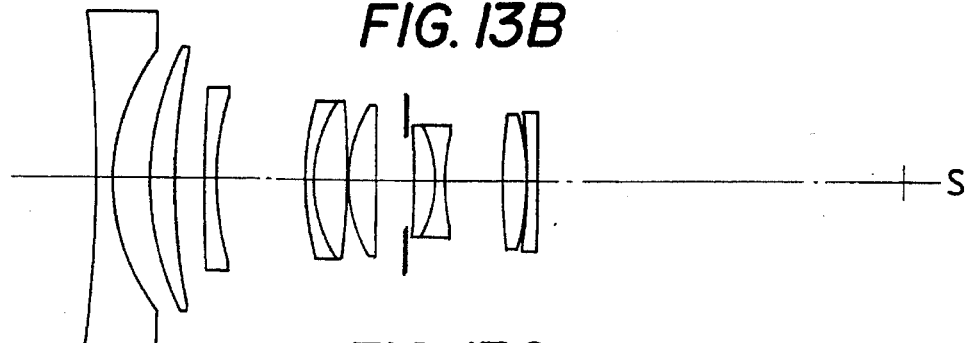
Figure 13C:
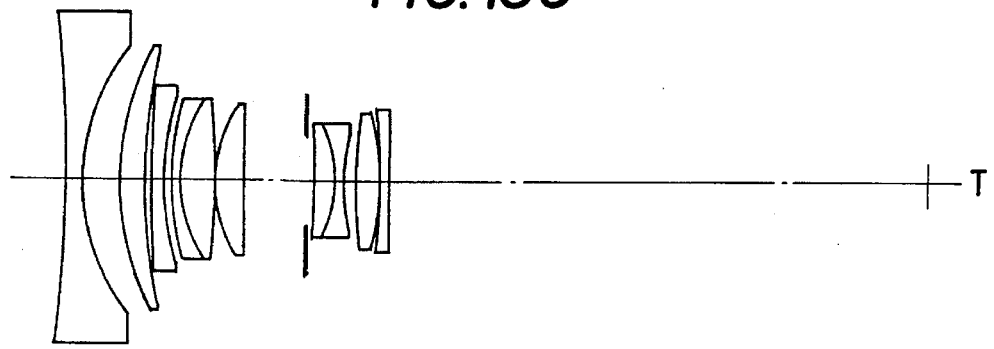
Figure 14A:
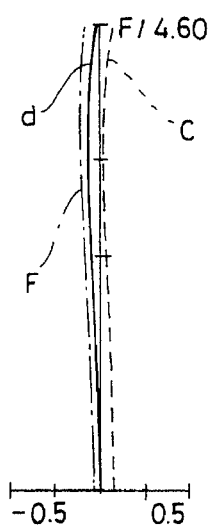
FIGS. 14A–14D show graphs illustrating aberration characteristics at the wide position of the first embodiment of the zoom lens system according to the present invention.
Figure 14B:
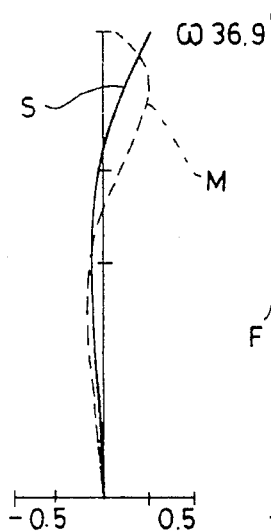
Figure 14C:
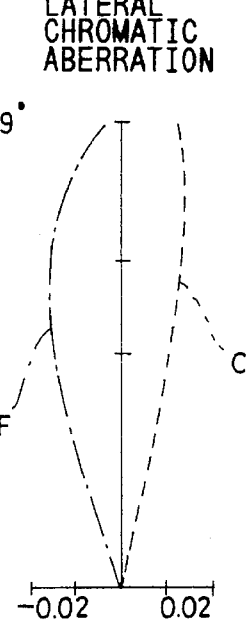
Figure 14D:
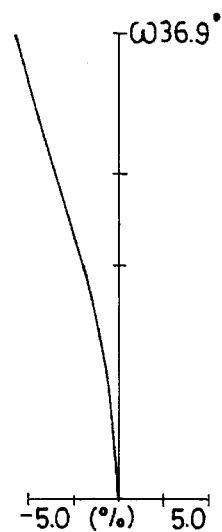
Figure 15A:
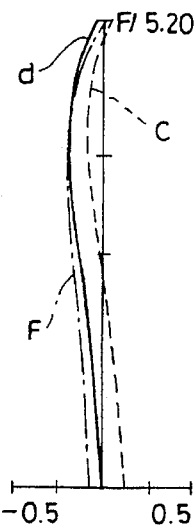
FIGS. 15A–15D show graphs illustrating aberration characteristics at an intermediate focal length of the first embodiment of the zoom lens system according to the present invention.
Figure 15B:
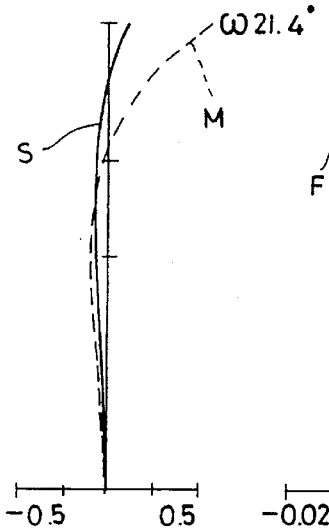
Figure 15C:
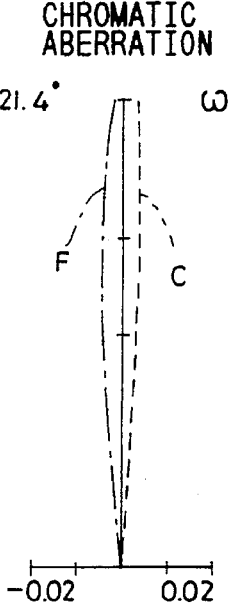
Figure 15D:
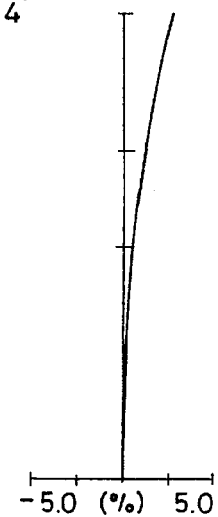
Figure 16A:
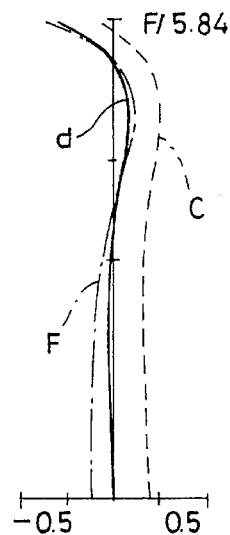
FIGS. 16A–16D show graphs illustrating aberration characteristics at the tele position of the first embodiment of the zoom lens system according to the present invention.
Figure 16B:
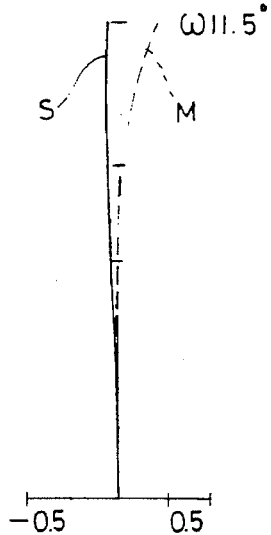
Figure 16C:
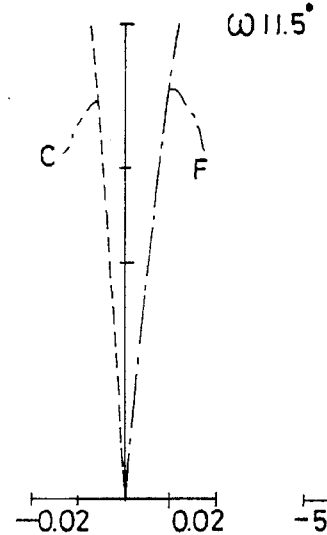
Figure 16D:
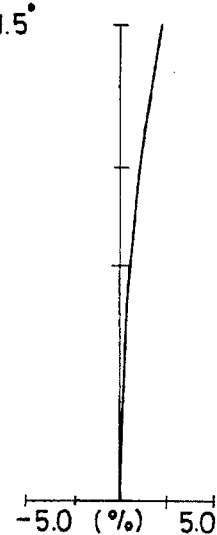
Figure 17A:
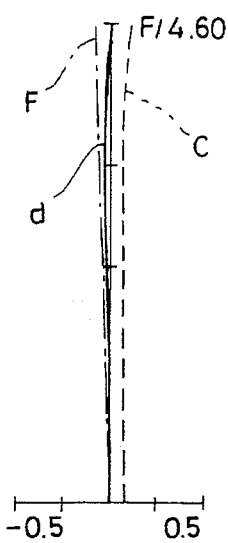
FIGS. 17A–17D show curves visualizing aberration characteristics at the wide position of the second embodiment of the zoom lens system according to the present invention.
Figure 17B:
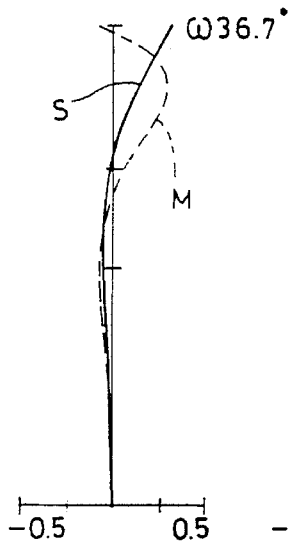
Figure 17C:
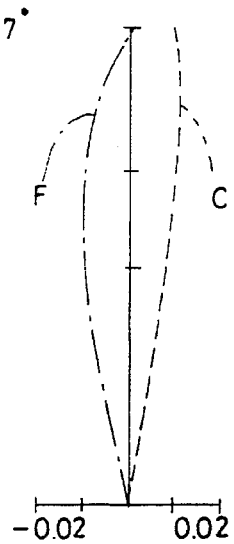
Figure 17D:
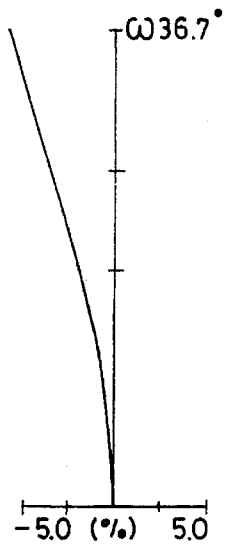
Figure 18A:
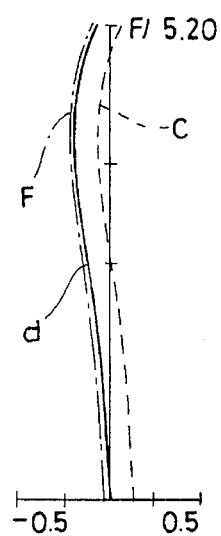
FIGS. 18A–18D show curves visualizing aberration characteristics at the intermediate focal length of the second embodiment of the zoom lens system according to the present invention.
Figure 18B:
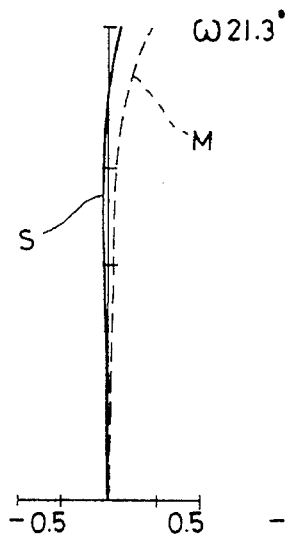
Figure 18C:
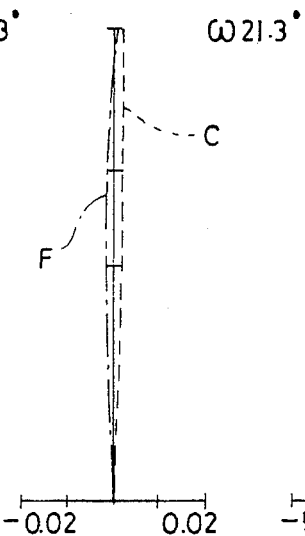
Figure 18D:
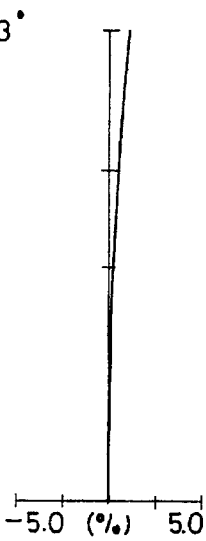
Figure 19A:
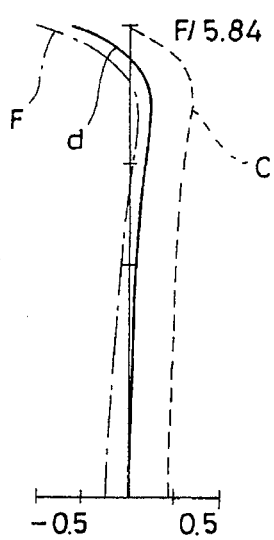
FIGS. 19A–19D shows curves visualizing aberration characteristics at the tele position of the second embodiment of the zoom lens system according to the present invention.
Figure 19B:
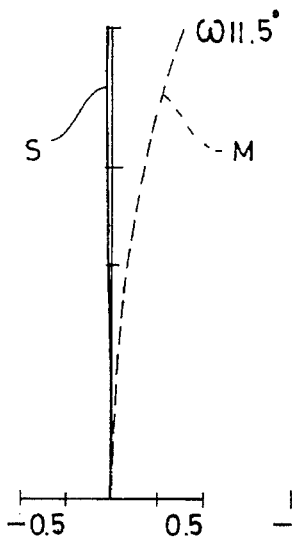
Figure 19C:
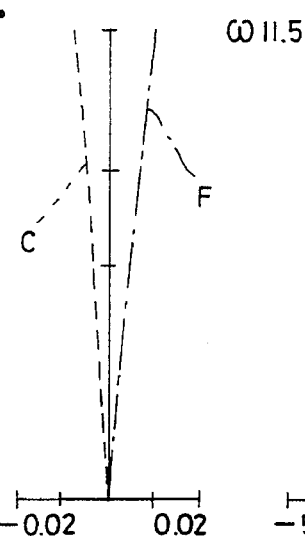
Figure 19D:
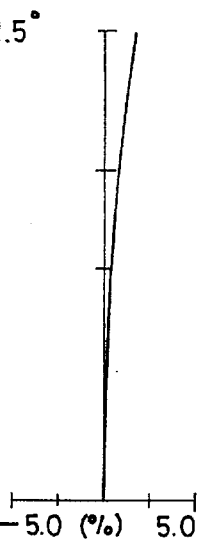
Figure 20A:
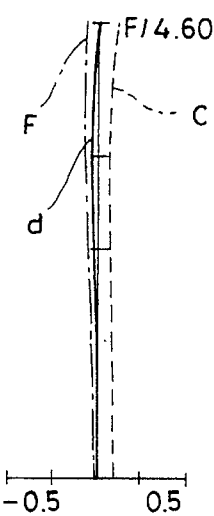
FIGS. 20A–20D show graphs visualizing aberration characteristics at the wide position of the third embodiment of the present invention.
Figure 20B:
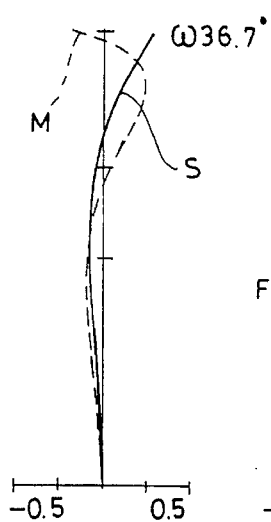
Figure 20C:
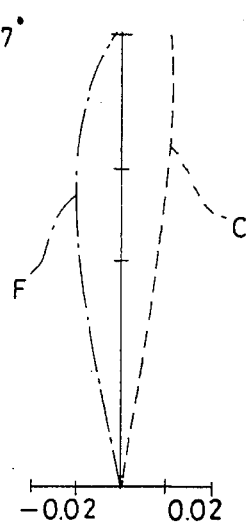
Figure 20D:
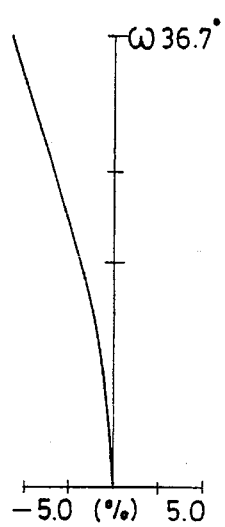
Figure 21A:
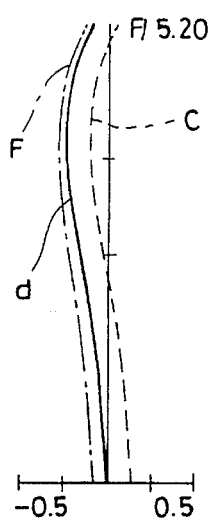
FIGS. 21A–21D show graphs visualizing aberration characteristics at the intermediate focal length of the third embodiment of the present invention.
Figure 21B:
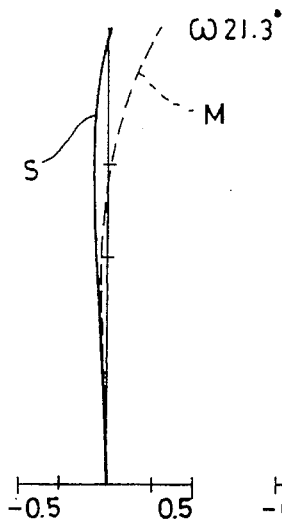
Figure 21C:
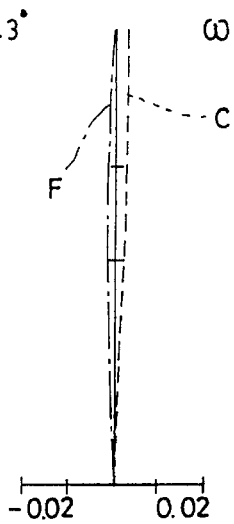
Figure 21D:
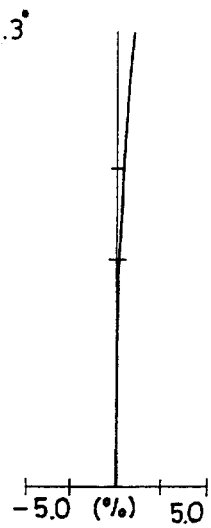
Figure 24A:
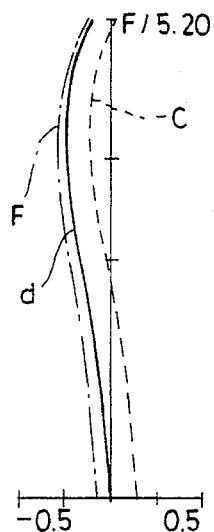
FIGS. 24A–24D show curves illustrating aberration characteristics at the intermediate focal length of the fourth embodiment of the present invention.
Figure 24B:
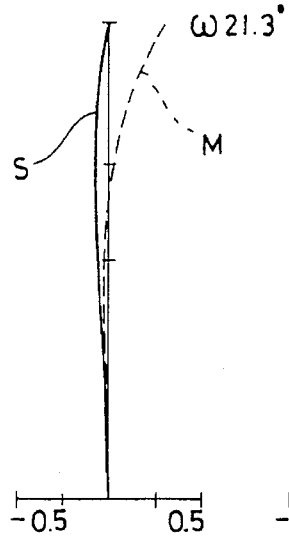
Figure 24C:
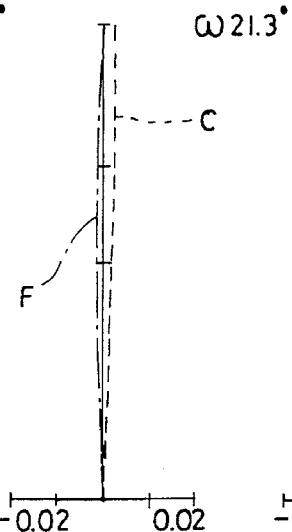
Figure 24D:
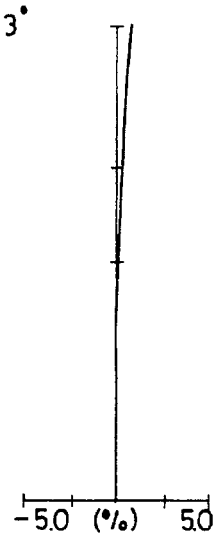
Figure 25A:
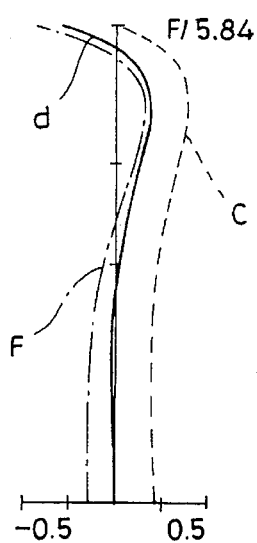
FIGS. 25A–25D show graphs illustrating aberration characteristics at the tele position of the fourth embodiment of the present invention.
Figure 25B:
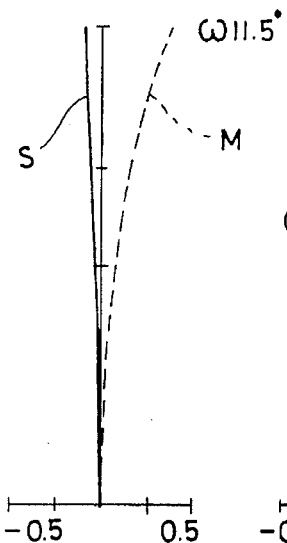
Figure 25C:
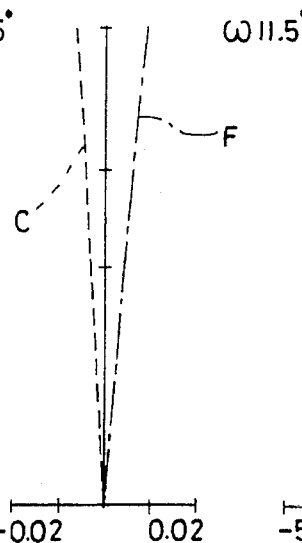
Figure 25D:
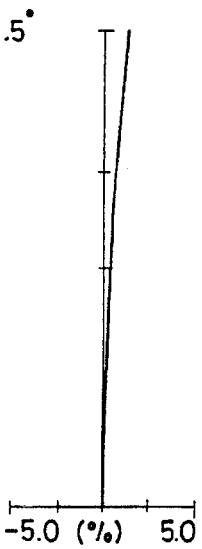
Figure 30A:
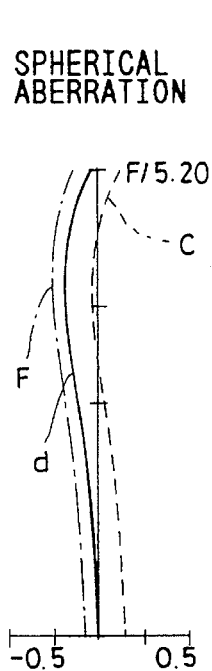
FIGS. 30A–30D shows curves visualizing aberration characteristics at the intermediate focal length of the sixth embodiment of the present invention.
Figure 30B:
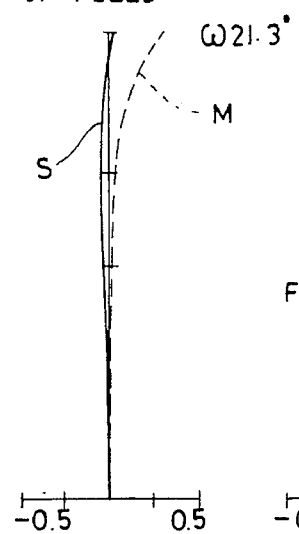
Figure 30C:
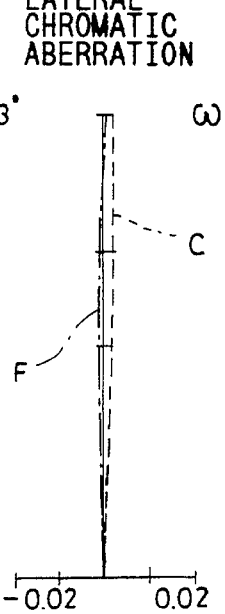
Figure 30D:
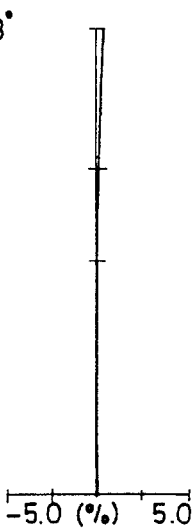
Figure 31A:
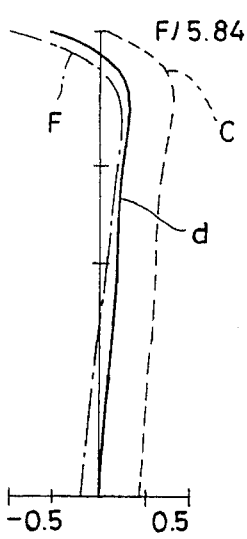
FIGS. 31A–31D show curves visualizing aberration characteristics at the tele position of the sixth embodiment of the present invention.
Figure 31B:
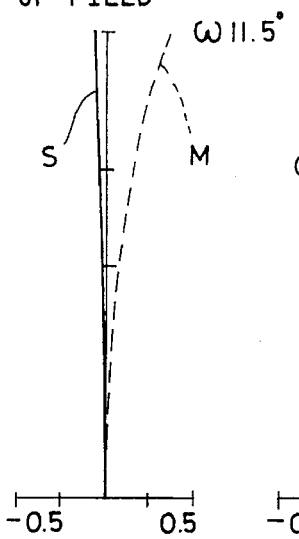
Figure 31C:
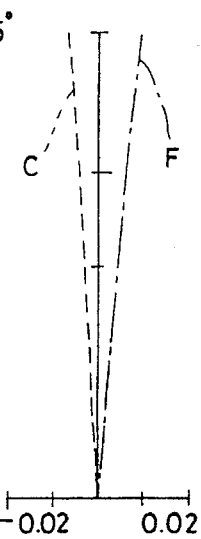
Figure 31D:
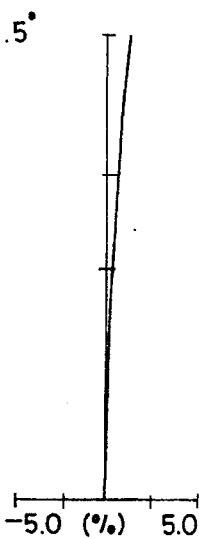
Figure 32A:
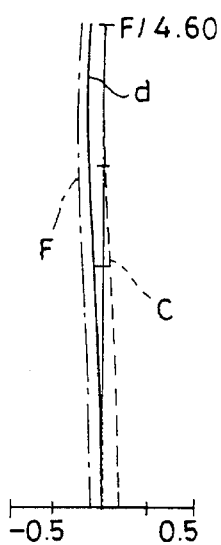
FIGS. 32A–32D show graphs visualizing aberration characteristics at the wide position of the seventh embodiment of the present invention.
Figure 32B:
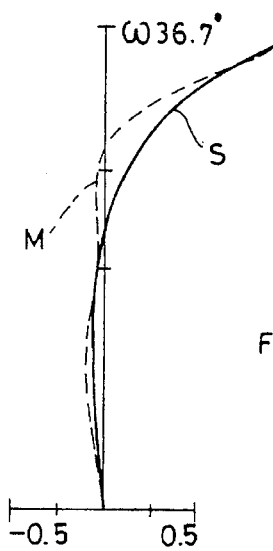
Figure 32C:
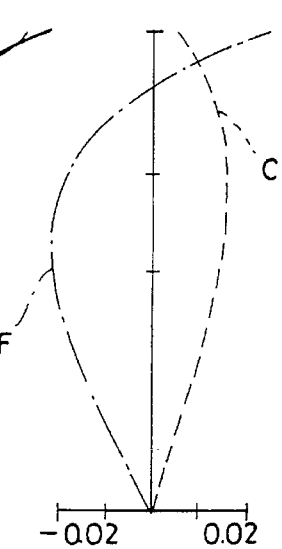
Figure 32D:
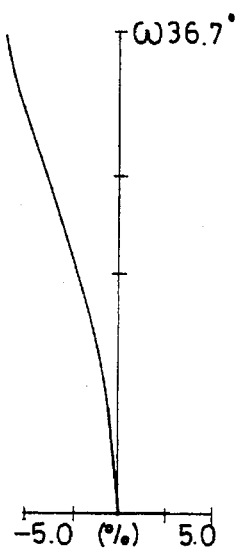
Figure 33A:
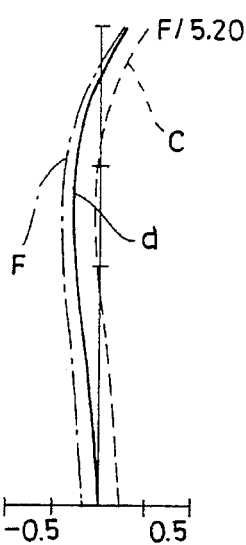
FIGS. 33A–33D show graphs visualizing aberration characteristics at the intermediate focal length of the seventh embodiment of the present invention.
Figure 33B:
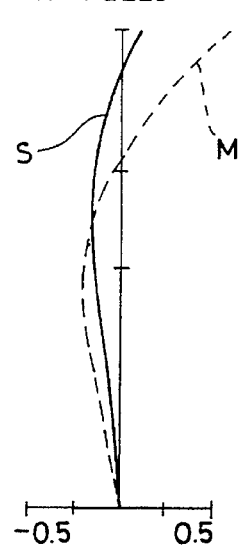
Figure 33C:
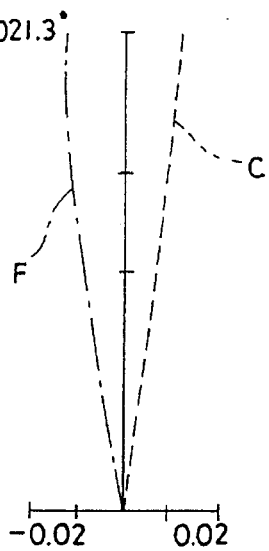
Figure 33D:
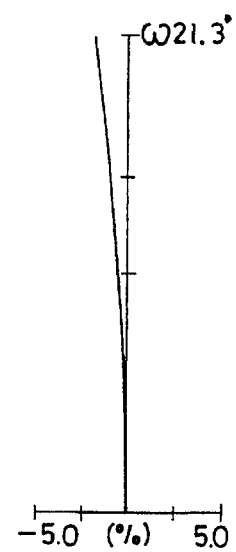

The first through eighth embodiments have the compositions illustrated in FIG. 6A through FIG. 13C respectively. Each of these embodiments is a wide-angle zoom lens system having a high vari-focal ratio which comprises lens components in a number as small as 10 or 11 and has aberrations favorably corrected despite a telephoto ratio as low as 1.4 to 1.6 at the tele position thereof. Telephoto ratios of these embodiments at the tele positions thereof are listed below:

| | |
|---|---|
| First Embodiment | 1.40 |
| Second Embodiment | 1.40 |
| Third Embodiment | 1.41 |
| fourth Embodiment | 1.43 |
| fifth Embodiment | 1.43 |
| sixth Embodiment | 1.44 |
| seventh Embodiment | 1.6 |
| eighth Embodiment | 1.32 |

Out of the embodiments described above, the seventh embodiment is configured so as to move two subunits independently in the third lens unit for the magnification change, i.e., adopts subunits to be moved for the magnification change in a number smaller than that of the subunits to be used for the magnification change in each of the other embodiments. Further, the seventh embodiment has a vari-focal ratio of 3.52. The eighth embodiment has a vari-focal ratio of 3.66.

The aspherical surfaces used in the embodiments described above have shapes which are expressed by the formula shown below:

$$x = \frac{(1/r)h^2}{1 + \sqrt{1 - (h/r)^2}} + Eh^4 + Fh^6 + Gh^8 + Hh^{10} + Ih^{12}$$

wherein the reference symbol x represents a departure of the aspherical surface from a reference sphere thereof as measured along the optical axis, the reference symbol h designates a height as measured from the optical axis, the reference symbol r denotes a paraxial radius of curvature, and the reference symbols E, F, G, H and I represent aspherical surface coefficients.

The wide-angle zoom lens system having a high vari-focal ratio according to the present invention is of the negative-leading type which is suited for wide-angle zoom lens systems, adopts the second lens unit which is disposed so as to exhibit a high effect for magnification change and correction of aberrations, has a telephoto ratio of approximately 1.5 at the tele position thereof, a wide field angle of 70° at the wide position thereof, a vari-focal ratio as high as approximately 4 and a compact size, and can be manufactured at a low cost.

I claim:

1. A wide-angle zoom lens system having a high vari-focal ratio comprising, in order from the object side:

a first lens unit, disposed on the most object side of said zoom lens system, having a negative refractive power, a second lens unit, disposed on an image side of said first lens unit, having a negative refractive power, and a third lens unit, disposed on an image side of said second lens unit with no element having optical power being disposed therebetween, having a positive refractive power, wherein size of at least one airspace reserved between said first lens unit and said second lens unit is varied to change focal length of said zoom lens system, and wherein said zoom lens system satisfies the following condition (1):

(1) $0.30 < H_{W12}/(H_{W12}+H_{W23}) < 1.0$ wherein the reference symbol $H_{W12}$ represents a distance as measured between a rear principal point of said first lens unit and a front principal point of said second lens unit at a wide position of said zoom lens system, and the reference symbol $H_{W23}$ designates a distance as measured from a rear principal point of said second lens unit to a front principal point of said third lens unit at a wide position of said zoom lens system.

2. A wide-angle zoom lens system having a high varifocal ratio comprising, in order from the object side:

a first lens unit having a negative refractive power, a second lens unit having a negative refractive power, and a third lens unit having a positive refractive power, wherein size of at least one airspace reserved between said first lens unit and said second lens unit is varied to change focal length of said zoom lens system, and wherein said zoom lens system satisfies the following condition (1):

(1) $0.30 < H_{W12}/(H_{W12}+H_{W23}) < 1.0$ wherein the reference symbol $H_{W12}$ represents a distance as measured between a rear principal point of said first lens unit and a front principal point of said second lens unit at a wide position of said zoom lens system, and the reference symbol $H_{W23}$ designates a distance as measured from a rear principal point of said second lens unit to a front principal point of said third lens unit at a wide position of said zoom lens system, wherein said third lens unit comprises at least two subunits, and wherein a change of the focal length from the wide position to the tele position of said zoom lens system is performed by moving said first lens unit toward the image side and then toward the object side, and moving said at least two subunits disposed in said third lens unit so as to shorten a focal length of said third lens unit and shift a front principal point of said third lens unit toward the object side.

3. A wide-angle zoom lens system having a high varifocal ratio according to claim 2 satisfying the following condition (2):

(2) $0.3 < R_{2R}/R_{3F} < 1.5$ wherein the reference symbol $R_{2R}$ represents a radius of curvature on an image side surface of said second lens unit and the reference symbol $R_{3F}$ designates a radius of curvature on an object side surface of said third lens unit.

4. A wide-angle zoom lens system having a high varifocal ratio according to claim 3 satisfying the following condition (3):

(3) $0.0 < R_{2F}/R_{1R} < 8.0$ wherein the reference symbol $R_{1R}$ represents a radius of curvature on an image side surface of said first lens unit and the reference symbol $R_{2F}$ designates a radius of curvature on an object side surface of said second lens unit.

5. A wide-angle zoom lens system having a high varifocal ratio according to claim 2 satisfying the following condition (4):

(4) $4 < f_2/f_1 < 20$ wherein the reference symbol $f_1$ represents a focal length of said first lens unit and the reference symbol $f_2$ designates a focal length of said second lens unit.

6. A wide-angle zoom lens system having a high varifocal ratio according to claim 5 satisfying the following condition (5):

(5) $0.2 < |f_1/f_T| < 0.7$ wherein the reference symbol $f_T$ represents a focal length of said zoom lens system at the tele position thereof.

7. A wide-angle zoom lens system having a high varifocal ratio according to claim 2 satisfying the following condition (6):

(6) $0.1 < f_{3T}/f_T < 0.4$ wherein the reference symbols $f_{3T}$ and $f_T$ represent focal lengths of said third lens unit and said zoom lens system as a whole respectively at the tele position thereof.

8. A wide-angle zoom lens system having a high varifocal ratio according to claim 7 wherein said third lens unit comprises, in order from the object side, a first subunit having a positive refractive power, a second subunit having a negative refractive power and a third subunit having a positive refractive power, and a change of the focal length of said zoom lens system is performed by moving these subunits along an optical axis.

9. A wide-angle zoom lens system having a high varifocal ratio according to claim 8 satisfying the following condition (7):

(7) $f_{31}/f_T < 0.4$ wherein the reference symbol $f_{31}$ represents a focal length of said first subunit.

10. A wide-angle zoom lens system having a high varifocal ratio comprising, in order from the object side:

a first lens unit having a negative refractive power, a second lens unit having a negative refractive power, and a third lens unit having a positive refractive power, wherein size of at least one airspace reserved between said first lens unit and said second lens unit is varied to change focal length of said zoom lens system, and wherein said zoom lens system satisfies the following condition (1):

(1) $0.30 < H_{W12}/(H_{W12}+H_{W23}) < 1.0$ wherein the reference symbol $H_{W12}$ represents a distance as measured between a rear principal point of said first lens unit and a front principal point of said second lens unit at a wide position of said zoom lens system, and the reference symbol $H_{W23}$ designates a distance as measured from a rear principal point of said second lens unit to a front principal point of said third lens unit at a wide position of said zoom lens system, wherein said first lens unit comprises a negative lens component and a positive lens component, wherein said second lens unit comprises a first subunit having a positive refractive power and a second subunit having a positive refractive power, and wherein zooming of said zoom lens system from the wide position to the tele position thereof is performed by moving said first lens unit toward the image side and then toward the object side so as to narrow an airspace reserved between said first lens unit and said second lens unit, and moving said third lens unit so as to narrow an airspace reserved between said second lens unit and said third lens unit.

11. A wide-angle zoom lens system having a high varifocal ratio according to claim 10 wherein said third lens unit comprises, in order from the object side, a first subunit having a positive refractive power, a second subunit having a negative refractive power and a third subunit having a positive refractive power, and wherein a change of the focal length of said zoom lens system from the wide position to the tele position thereof is performed by moving said subunits so as to widen an airspace reserved between said first subunit and said second subunit, and narrow an airspace reserved between said second subunit and said third subunit.

12. A wide-angle zoom lens system having a high varifocal ratio according to claim 10 wherein said third lens unit comprises, in order from the object side, a first subunit having a positive refractive power and a second subunit having a positive refractive power, and wherein a change of the focal length of said zoom lens system from the wide position to the tele position thereof is performed by narrowing an airspace reserved between said first subunit and said second subunit.

13. A wide-angle zoom lens system having a high varifocal ratio according to claim 11 wherein said second subunit comprises a cemented lens component.

14. A wide-angle zoom lens system having a high varifocal ratio according to claim 12 wherein said first subunit comprises a cemented lens component.

15. A wide-angle zoom lens system having a high varifocal ratio according to claim 11 wherein said third subunit comprises an aspherical surface.

16. A wide-angle zoom lens system having a high varifocal ratio according to claim 12 wherein said second subunit comprises an aspherical surface.

17. A wide-angle zoom lens system having a high varifocal ratio according to claim 15 wherein said first lens unit comprises an aspherical surface.

18. A wide-angle zoom lens system having a high varifocal ratio according to claim 10 wherein said second lens unit consists of a single negative lens.

19. A wide-angle zoom lens system having a high varifocal ratio according to claim 10 wherein said second lens unit consists of a doublet.

20. A wide-angle zoom lens system having a high varifocal ratio according to claim 10 wherein said third lens unit comprises an aperture stop.

21. A wide-angle zoom lens system having a high varifocal ratio comprising, in order from the object side: a first lens unit having a negative refractive power, a second lens unit having a negative refractive power and a third lens unit having a positive refractive power; wherein said third lens unit comprises at least two subunits, and wherein a change of the focal length of said zoom lens system from the wide position to the tele position thereof is performed by moving said first lens unit toward the image side and then toward the object side, and moving said at least two subunits disposed in said third lens unit so as to shorten a focal length of said third lens unit and shift a front principal point of said third lens unit toward the object side.

22. A wide-angle zoom lens system having a high varifocal ratio according to claim 21 wherein said third lens unit comprises, in order from the object side, a first subunit having a positive refractive power and a second subunit having a positive refractive power, and wherein said zoom lens system is zoomed from the wide position to the tele position by narrowing the airspace reserved between said first subunit and said second subunit.

* * * * *